United States Patent
Gerlach et al.

(10) Patent No.: US 7,573,637 B2
(45) Date of Patent: Aug. 11, 2009

(54) INTRINSIC POLARIZER AND METHOD OF MANUFACTURING AN INTRINSIC POLARIZER

(75) Inventors: Michael K. Gerlach, Brookline, MA (US); Gerald N. Nkwantah, Brockton, MA (US); Jonathan M. Mack, Boylston, MA (US); Pradnya V. Nagarkar, Newton, MA (US); Philip J. Ralli, Sudbury, MA (US)

(73) Assignee: Seiko Epson Corporation, Tokyo (JP)

( * ) Notice: Subject to any disclaimer, the term of this patent is extended or adjusted under 35 U.S.C. 154(b) by 171 days.

(21) Appl. No.: 10/910,211

(22) Filed: Aug. 3, 2004

(65) Prior Publication Data
US 2006/0028725 A1     Feb. 9, 2006

(51) Int. Cl.
G02B 5/30     (2006.01)
(52) U.S. Cl. ....................... 359/490; 359/491
(58) Field of Classification Search ........... 359/490, 359/491, 492, 500
See application file for complete search history.

(56) References Cited

U.S. PATENT DOCUMENTS

| | | | |
|---|---|---|---|
| 2,445,555 A * | 7/1948 | Binda ........................ 359/490 |
| 4,659,523 A | 4/1987 | Rogers et al. |
| 4,772,663 A | 9/1988 | Marten et al. |
| 4,895,769 A | 1/1990 | Land et al. |
| 4,948,857 A | 8/1990 | Marten et al. |
| 5,051,286 A | 9/1991 | Starzewski |
| 5,073,014 A | 12/1991 | Ostoja-Starzewski |
| 5,666,223 A | 9/1997 | Bennett et al. |
| 5,973,834 A * | 10/1999 | Kadaba et al. ............. 359/490 |
| 6,549,335 B1 * | 4/2003 | Trapani et al. ............. 359/490 |
| 6,808,657 B2 * | 10/2004 | Fansler et al. ............. 264/1.34 |
| 6,814,899 B2 * | 11/2004 | Cael et al. ................. 264/1.34 |
| 6,985,292 B2 * | 1/2006 | Ishii et al. .................. 359/490 |
| 7,203,002 B2 * | 4/2007 | Saiki et al. ................. 359/491 |
| 2003/0157353 A1 | 8/2003 | Fansler et al. |
| 2003/0170478 A1 | 9/2003 | Cael et al. |
| 2003/0189264 A1 | 10/2003 | Jones et al. |
| 2003/0189275 A1 | 10/2003 | Cael et al. |
| 2004/0080825 A1 | 4/2004 | Harita et al. |
| 2005/0073065 A1 * | 4/2005 | Mack et al. ................ 264/1.34 |
| 2005/0084698 A1 * | 4/2005 | Cael et al. .................. 428/522 |
| 2006/0039070 A1 * | 2/2006 | Sugimura et al. .......... 359/490 |

(Continued)

FOREIGN PATENT DOCUMENTS

EP     0926515     6/1999

(Continued)

*Primary Examiner*—Ricky D Shafer
(74) *Attorney, Agent, or Firm*—Oliff & Berridge, PLC

(57) ABSTRACT

An improved method of forming an intrinsic polarizer, referred to as a K-type polarizer, includes stretching a polymeric film a first stretching step. The polymeric film comprises a hydroxylated linear polymer which is converted after the first stretching step to form dichroic, copolymer polyvinylene blocks aligned in the polymeric film. The polymeric film is stretched in a second stretching step while converting the hydroxylated linear polymer. This method produces an improved K-type polarizer with excellent polarizing and color characteristics. For example, the dichroic ratio is higher than 100, the color shift for light passed through the polarizer in a crossed configuration is low, and the absorption of light in the blue region of the visible spectrum is more than one half of the absorption for light in the middle of the visible spectrum.

13 Claims, 13 Drawing Sheets

U.S. PATENT DOCUMENTS

2006/0139574 A1 * 6/2006 Ralli et al. .................... 353/20

FOREIGN PATENT DOCUMENTS

| EP | 1154290 | 11/2001 |
|---|---|---|
| JP | 56061431 | 5/1981 |
| WO | WO 03/069382 | 8/2003 |
| WO | WO 03/085427 | 10/2003 |

* cited by examiner

INTRINSIC POLARIZER AND METHOD OF MANUFACTURING AN INTRINSIC POLARIZER

CROSS-REFERENCE TO RELATED APPLICATIONS

This application concerns the technical field of intrinsic polarizers, which is also addressed by the following U.S. patent applications: application Ser. No. 10/403,885, filed Mar. 31, 2003, entitled "PROCESS FOR MAKING AN INTRINSIC POLARIZER," which is a continuation-in-part of application Ser. No. 10/277,252 filed Oct. 20, 2002 entitled "ENHANCED INTRINSIC POLARIZER", which is a continuation-in-part of pending application Ser. No. 10/118,489 filed Apr. 6, 2002, entitled "ENHANCED K-TYPE POLARIZER", the relevant parts of which are incorporated by reference herein.

FIELD OF THE INVENTION

The invention relates to synthetic dichroic plane polarizers based on molecularly oriented polyvinyl alcohol films and, in particular, to a method of making a high efficiency intrinsic polarizing sheet or film.

BACKGROUND

Normally, light waves vibrate in a large number of planes about the axis of a light beam. If the waves vibrate in one plane only, the light is said to be plane polarized. Several useful optical systems can be implemented using polarized light. For example, in the manufacture of electro-optical devices such as liquid crystal display screens, crossed polarizers are used in conjunction with an addressable liquid crystal interlayer to provide the basis for image formation. In the field of photography, polarizing filters have been used to reduce the glare and the brightness of specular reflection. Polarizing filters, circular polarizers or other optical components have also been used for glare reduction in display device screens.

Linear light polarizing films, in general, owe their properties of selectively passing radiation vibrating along a given electromagnetic radiation vector, and absorbing electromagnetic radiation vibrating along a second given electromagnetic radiation vector, to the anisotropic character of the transmitting film medium. Dichroic polarizers are absorptive, linear polarizers having a vectoral anisotropy in the absorption of incident light. The term "dichroism" is used herein as meaning the property of differential absorption and transmission of the components of an incident beam of light depending on the polarization direction of the incident light. Generally, a dichroic polarizer will transmit radiant energy polarized along one electromagnetic vector and absorb energy polarized along a perpendicular electromagnetic vector. A beam of incident light, on entering a dichroic polarizer, encounters two different absorption coefficients, one low and one high, so that the emergent light vibrates substantially in the direction of low absorption (high transmission).

SUMMARY OF THE INVENTION

Intrinsic polarizers are polarizers whose base material is converted to a dichroic material, and so a polarizing effect is produced without the need to adsorb a dichroic material, such as iodine or dye, to the base material. Intrinsic polarizers, therefore, have a simpler construction, provide the possibility of being less expensive, are thinner and do not require the additional cover layers required by iodine or dye polarizers.

One embodiment of the invention is directed to a method for making a polarizer from a polymeric film having an original length and comprising a hydroxylated linear polymer. The method comprises stretching the polymeric film a first stretching step and converting the hydroxylated linear polymer, after the first stretching step, to form dichroic, copolymer polyvinylene blocks aligned in the polymeric film. The polymeric film is stretched in a second stretching step while converting the hydroxylated linear polymer.

Another embodiment of the invention is directed to an intrinsic polarizer that comprises a sheet of PVA-type matrix containing vinylene polymer blocks. The sheet defines a pass polarization axis and a block polarization axis perpendicular to the pass polarization axis. Light having an electrical vector parallel to the pass polarization axis is substantially transmitted through the sheet and light having an electrical vector parallel to the block polarization axis is substantially absorbed in the sheet. The sheet exhibits a ratio, R, having a value of less than 2, where R is the ratio of the intrinsic absorbance for light at 550 nm polarized parallel to the. block polarization axis over the intrinsic absorbance for light at 400 nm polarized parallel to the block polarization axis. The sheet also exhibits a polarization efficiency ratio in excess of 99%.

Another embodiment of the invention is directed to an intrinsic polarizer that comprises a sheet of PVA-type matrix containing vinylene polymer blocks. The sheet defines a pass polarization axis and a block polarization axis perpendicular to the pass polarization axis. Light having an electrical vector parallel to the pass polarization axis is substantially transmitted through the sheet and light having an electrical vector parallel to the block polarization axis is substantially absorbed by the vinylene polymer blocks. The sheet has an intrinsic absorption spectrum such that, when crossed with an identical sheet and illuminated with a cold cathode fluorescent tube (CCFT) light source, the sheet transmits light having an a* co-ordinate with a magnitude of less than 2 and a b* co-ordinate with a magnitude of less than 2.

Another embodiment of the invention is directed to an intrinsic polarizer that comprises a sheet of PVA-type matrix containing vinylene polymer blocks. The sheet defines a pass polarization axis and a block polarization axis perpendicular to the pass polarization axis. Light having an electrical vector parallel to the pass polarization axis is substantially transmitted through the sheet and light having an electrical vector parallel to the block polarization axis is substantially absorbed by the vinylene polymer blocks. The sheet exhibits a dichroic ratio of more than 100.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
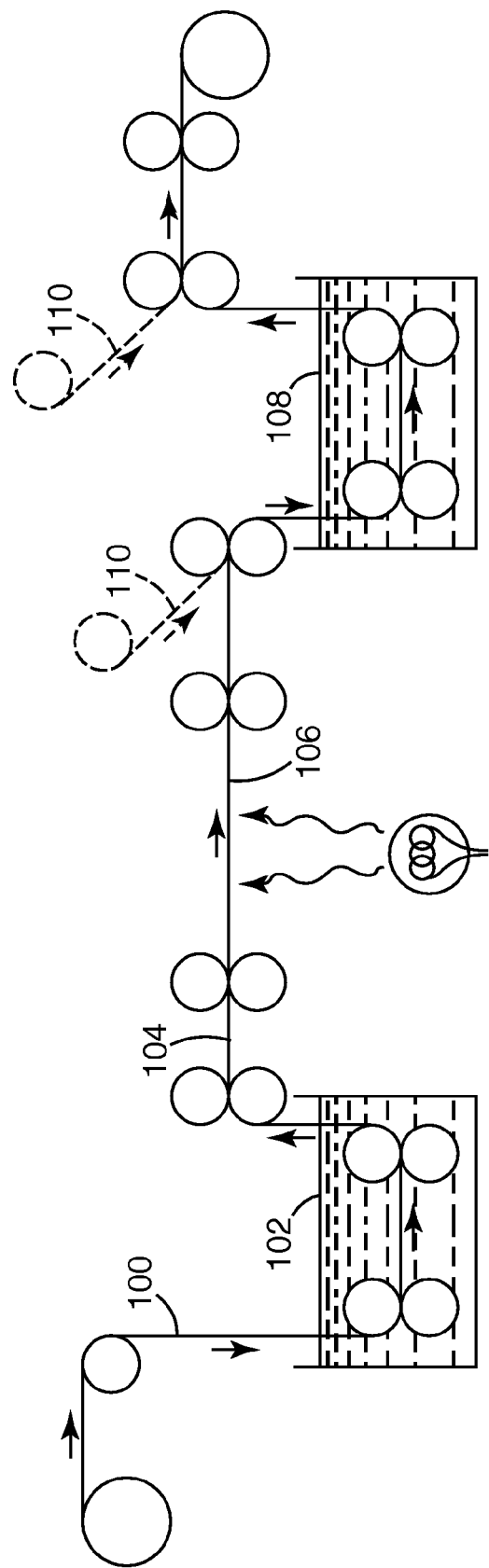
FIG. 1 schematically illustrates a method of manufacturing a polarizer according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to intrinsic polarizers, and is more particularly applicable to a method of making an intrinsic polarizer with improved optical properties.

Examples of intrinsic polarizers include, for example, a polyvinylene-based polarizer such as a K-type polarizer. An intrinsic polarizer derives its basic dichroism from the light-absorbing properties of its matrix, rather than from the light-absorbing properties of dye additives, stains, or suspended crystalline material, although additives such as dyes may be used to supplement the intrinsic dichroism. Typically, intrinsic polarizers comprise a sheet or film of oriented poly(vinyl alcohol)-type (PVA-type) material, having an oriented suspension of a dehydration product of PVA, polyvinylene in a matrix of PVA. Intrinsic polarizers of this kind are typically formed by unidirectionally stretching the polymeric film to align the PVA matrix and by heating the PVA-type polymeric film in the presence of a dehydration catalyst, such as hydrochloric acid, to produce conjugated polyvinylene blocks. The formation of conjugated polyvinylene blocks from the polyvinyl alcohol is often referred to as "conversion." The oriented and dehydrated film may be referred to as "raw K". By orienting the PVA matrix unidirectionally, the transition moments of the conjugated polyvinylene blocks are also oriented, and the material becomes visibly dichroic. The conjugated polyvinylene blocks may be referred to as dichroic chromophores. A boration treatment may be employed after converting the polymeric film, as described in U.S. Pat. No. 5,666,223, the relevant parts of which are incorporated herein by reference.

The present invention relates to an enhanced intrinsic polarizer and method of making same in which improved polarizing properties are obtained. One embodiment of the method is directed to stretching the PVA film in a first stretching step, and then converting the film while stretching the film in a second stretching step. The first stretching step may take place before, during, or after the film has been exposed to the dehydration catalyst.

The resulting polarizer comprises a composite of a molecularly oriented film of PVA/polyvinylene block copolymer material having the polyvinylene blocks thereof formed by molecular dehydration of a film of polyvinylalcohol. The molecularly oriented film of polyvinylalcohol/polyvinylene block copolymer material comprises a uniform distribution of light-polarizing molecules of polyvinylalcohol/polyvinylene block copolymer material varying in the number (n) of the conjugated repeating vinylene units of the polyvinylene block of the copolymer. The value of n ranges from 2 to about 25. The degree of orientation of the light polarizing molecules increases throughout the range with increasing values of n. The degree of orientation of the molecules in conjunction with the concentration distribution of each polyvinylene block is sufficient to impart to the polymeric sheet a photopic dichroic ratio ($R_D$), of at least 75.

Ignoring surface reflections, the photopic dichroic ratio, D, is defined as:

$$D = A_z/A_y \qquad (1)$$

where $A_z$ and $A_y$ are determined in the following manner. The sample polarizer is illuminated with the sample beam of white light in a dual beam spectrophotometer. The sample beam is pre-polarized using a high efficiency Glan-type polarizer. The amount of light transmitted through the sample polarizer at a particular wavelength is compared to the amount of light at the same wavelength in the reference beam, and the absolute absorbance of the sample polarizer is calculated as a function of wavelength from the ratio of the transmitted light in the sample and reference beams. The absorbance is calculated over the range 380 nm-780 nm. The absorbance spectra are obtained both for light polarized parallel to the transmission axis of the sample polarizer and for light polarized perpendicular to the transmission axis of the sample polarizer. The parallel and perpendicular absorbance spectra are then spectrally corrected for the spectrum of a particular light source and the response of the human eye (photopic correction). The integrated area under the corrected parallel absorbance spectrum corresponds to the amount of spectrally corrected light in the parallel polarization state that is absorbed in a single pass through the sample polarizer, $A_y$. The integrated area under the corrected perpendicular absorbance spectrum corresponds to the amount of spectrally corrected light, in the perpendicular polarization state, that is absorbed in a single pass through the sample polarizer, $A_z$.

Figure 13:
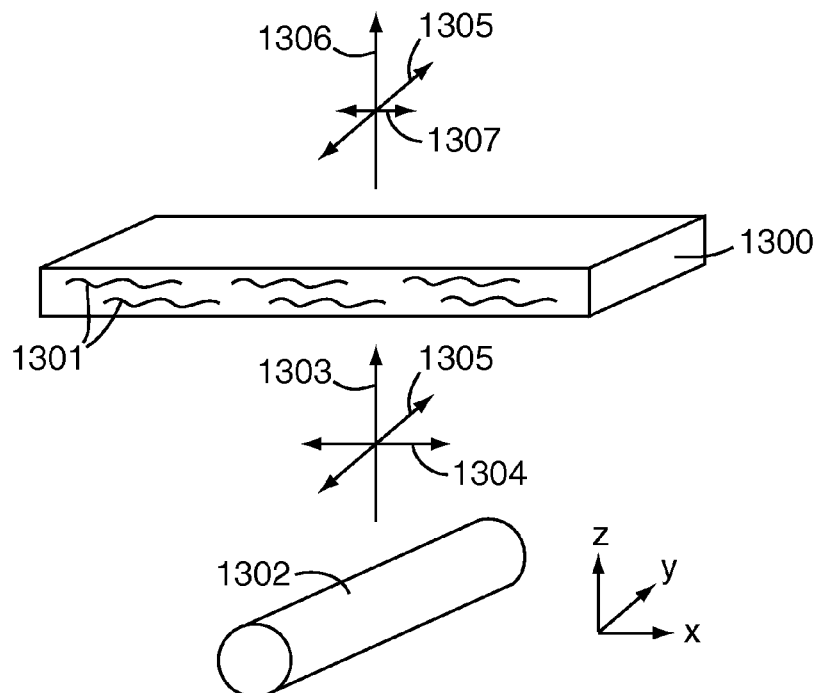
FIG. 13 schematically illustrates passage of light through an exemplary intrinsic polarizer.

FIG. 13 schematically illustrates passage of light through an exemplary intrinsic polarizer disclosed herein. Intrinsic polarizer 1300 comprises a polyvinylalcohol-type matrix containing vinylene polymer blocks 1301. The polymer blocks have been oriented by stretching. The polarizer is in the form of a sheet which defines x, y, and z axes, all of which are orthogonal. Cold cathode fluorescent tube 1302 emits light, depicted by single ray 1303, consisting of unpolarized light represented by electrical vectors 1304 and 1305. Electrical vector 1304 is parallel to the x axis also referred to as the block polarization axis. Electrical vector 1305 is parallel to the y axis also referred to as the pass polarization axis. The intrinsic polarizer transmits light, depicted by single ray 1306, which consists of polarized light represented by electrical vectors 1305 and 1307. Ideally, no light is absorbed along the pass polarization axis; electrical vector 1305 is shown unchanged after passing through the polarizer. It is generally desirable for all light to be blocked along the block polarization axis, however, light typically leaks through the polarizer; thus, electrical vector 1304 becomes reduced in magnitude to give electrical vector 1307 after passing through the polarizer.

Figure 14:
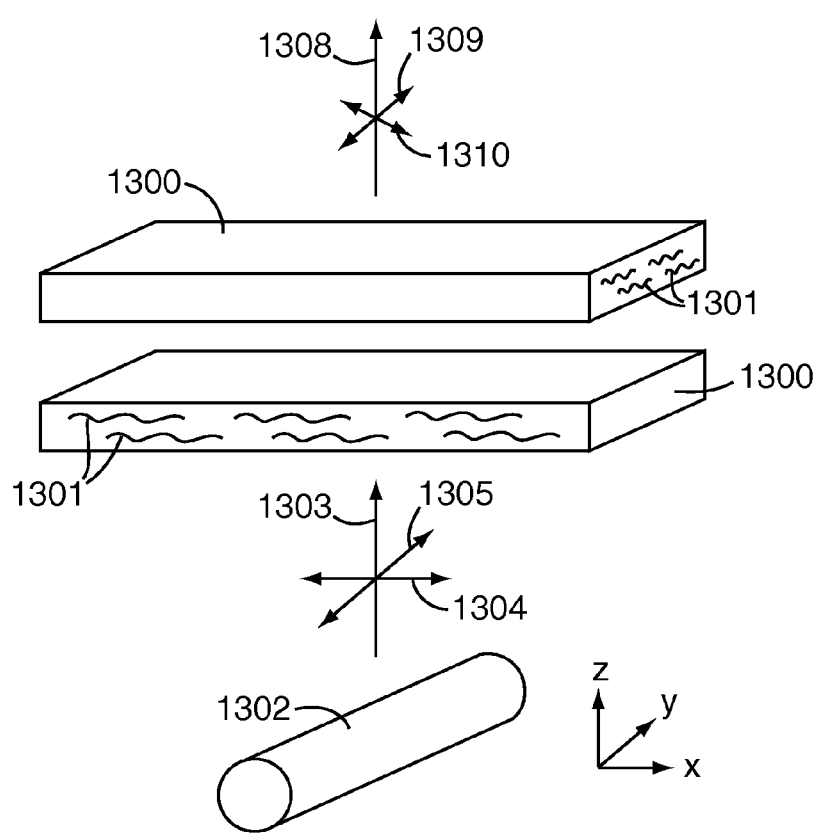
FIG. 14 schematically illustrates passage of light through a pair of crossed exemplary intrinsic polarizers.

FIG. 14 schematically illustrates passage of light through a pair of crossed exemplary intrinsic polarizers. An identical sheet of intrinsic polarizer 1300 is placed adjacent the polarizer such that the orientations of the vinylene polymer blocks 1301 are generally perpendicular to each other. Light depicted by single ray 1306 passes through the pair of crossed polarizers with transmitted light represented by single ray 1308. Ideally, all light along the x and y axes is blocked from being transmitted, however, light along these axes typically leaks through the pair of crossed polarizers; thus, electrical vectors 1304 and 1305 become reduced in magnitude to give electrical vectors 1310 and 1309, respectively. The transmitted light represented by single ray 1308 has an a* co-ordinate with a magnitude of less than 2 and a b* co-ordinate with a magnitude of less than 2, wherein the a* and b* co-ordinates are measured according to the CIELAB color system.

One method for producing an enhanced intrinsic polarizer of the present invention is now described with respect to FIG. 1, which generally shows different steps in the manufacturing process of a K-type polarizer. The PVA-type film 100 is exposed to a dehydration catalyst 102, such as an aqueous acid solution, and is provided with a first stretch. The first stretch may take place before, during or after the film is exposed to the dehydration catalyst. The film 104 is then converted to produce the dichroic chromophore and simultaneously stretched in a second stretching step 106. After conversion, the film may be borated 108, for example in a boration bath, and then dried and stretched in a third stretching step.

A support layer 110 may optionally be added to the film and/or stripped off from the intrinsic polarizer film at various stages during the manufacturing process. In the illustrated embodiment, a support layer 110 is optionally added either before or after the boration step 108.

Intrinsic Polarizer Starting Material

K-type polarizers use polymeric films derived from molecularly oriented polyvinyl alcohol. Vinylalcohol polymers include any linear 1,3-polyhydroxylated polymer or copolymer, or derivative thereof that may be dehydrated to a linear, conjugated vinylic polymer. Useful vinylalcohol polymers include polymers and copolymers of units having the formula:

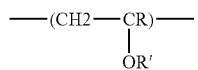

wherein R is H, a $C_1$-$C_8$ alkyl, or an aryl group; and R' is H, or a hydrolysable functional group such as a $C_1$-$C_8$ acyl group. Preferably, R and R' are H. In addition to poly(vinyl alcohol) polymers and copolymers, specifically contemplated are polyvinyl acetals and ketals and esters as materials from which the molecularly oriented sheet or film can be formed. These are referred to a PVA-type materials. In the following discussion, references to poly(vinyl alcohol) are understood to cover polyvinyl acetals and ketals and esters, and references to vinylalcohol are understood to cover vinyl acetals, vinyl ketals and vinyl esters.

Useful co-monomers that may be polymerized with the vinylalcohol monomers to produce vinylalcohol copolymers may include any free-radically polymerizable monomers including olefins, such as ethylene, propylene and butylene, acrylates, acetylenes and methacrylates such as methyl (meth)acrylate, vinyl acetates and styrenes. Specifically contemplated for use in the present invention are copolymers of ethylene and vinylalcohol. Generally, the amount of co-monomer is less than 30 mole % and is preferably less than 10 mole %. Higher amounts may retard the formation of conjugated vinylene blocks (poly(acetylene) blocks) and deleteriously affect the performance of the polarizer.

The preferred vinylalcohol polymers are homo- and copolymers of polyvinyl alcohol. Most preferred are polyvinyl alcohol homopolymers. Commercially available polyvinyl alcohols, such as those available from Celanese Chemicals, Inc., Dallas, Tex., under the tradename CELVOL, are classified by viscosity and percent hydrolysis. Polyvinyl alcohols having low viscosities are preferred for ease of coating, while having a sufficiently high molecular weight to provide adequate moisture resistance and good mechanical properties.

Melt-processible polyvinyl alcohol may also be used in this invention.

The melt processible vinylalcohol polymers are plasticized to enhance their thermal stability and allow them to be extruded or melt-processed. The plasticizer can be added externally or may be part of the vinylalcohol polymer chain, in other words the plasticizer is polymerized or grafted onto the vinylalcohol polymer backbone.

Vinylalcohol polymers that can be externally plasticized include commercially available products such as "Mowiol" 26-88 and "Mowiol" 23-88 vinylalcohol polymer resin available from Clariant Corp., Charlotte, N.C. These "Mowiol" vinylalcohol polymer resins have a degree of hydrolysis of 88%. "Mowiol" 26-88 vinylalcohol polymer resin has a degree polymerization of 2100 and a molecular weight of about 103,000.

Plasticizers useful in externally plasticizing vinylalcohol polymer include high boiling, water-soluble, organic compounds having hydroxyl groups. Examples of such compounds include glycerol, polyethylene glycols such as triethylene glycol and diethylene glycol, trimethylol propane, and combinations thereof. Water is also useful as a plasticizer. The amount of plasticizer to be added varies with the molecular weight of the vinylalcohol polymer. In general, the plasticizer will be added in amounts of between about 5% to about 30%, and preferably between about 7% to about 25%. Lower molecular weight vinylalcohol polymers typically require less plasticizer than higher molecular weight vinylalcohol polymers. Other additives for compounding externally plasticized vinylalcohol polymers include processing aids, i.e. Mowilith DS resin from Hoechst A. G., and anti-blocking agents, i.e., stearic acid, hydrophobic silica, colorants, and the like.

Externally plasticized vinylalcohol polymers are compounded by slowly adding the organic plasticizer and typically water to the vinylalcohol polymer powder or pellets under constant mixing until the plasticizer is incorporated into the vinylalcohol polymer, which occurs when the batch reaches a temperature of from about 82° C. (180° F.) to about 121° C. (250° F.). The lower the molecular weight of the vinylalcohol polymer resin, the lower the maximum batch temperature required to incorporate the plasticizer. The batch is held at that temperature for about 5 to 6 minutes. The batch is then cooled to about between 71° C. (160° F.) and 93° C. (200° F.) at which time an antiblocking agent can be added. The batch is further cooled to about 66° C. (150° F.), at which time the vinylalcohol polymer granulates can be removed from the mixer and extruded.

The compounding steps used to externally plasticize the vinylalcohol polymer can be eliminated when an internally plasticized vinylalcohol polymer is made, except where it is desirable to add colorants, etc. Useful internally plasticized vinylalcohol polymers are commercially available. Such products include "Vinex" 2034 and "Vinex" 2025, both available from Celanese Chemicals and Vinylon VF-XS available from Kuraray (Japan).

Materials available from Celanese under the Vinex trademark represents a unique family of thermoplastic, water-soluble, polyvinylalcohol resins. Specifically, the "Vinex" 2000 series including "Vinex" 2034 and "Vinex" 2025 represent internally plasticized cold and hot water soluble polyvinylalcohol copolymer resins. Such internally plasticized vinylalcohol copolymers are described in U.S. Pat. No. 4,948,857, herein incorporated by reference. Such copolymers have the following general formula:

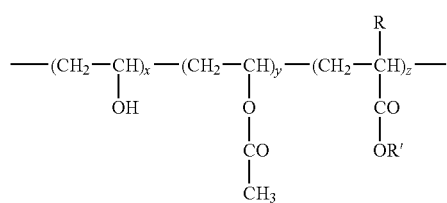

where R is hydrogen or methyl;
R' is a $C_6$-$C_{18}$ acyl group
y is 0 to 30 mole %;
z is 0.5 to 8 mole %; and
x is 70 to 99.5 mole %.

These copolymers retain the strength properties of poly(vinylalcohol) while also exhibiting increased flexibility. The acrylate monomer represented in the above formula gives the copolymer its internal plasticization effect. The degree of polymerization of the copolymers can range from about 100 up to about 4000, preferably between about 2000 and 4000. The degree of polymerization is defined as the ratio of molecular weight of the total polymer to the molecular weight of the unit as referenced in formula 2. Other internally plasticized poly(vinylalcohol) copolymer resins and preparation of these resins are discussed in U.S. Pat. No. 4,772,663. "VINEX" 2034 resin has a melt index typically of about 8.0 g/10 mins. and a glass transition temperature of about 30° C. (86° F.). "VINEX" 2025 resin has a melt index typically of 24 g/10 mins. and a glass transition temperature of about 29° C. (84° F.).

Polyvinyl alcohols and copolymers thereof, are commercially available with varying degrees of hydrolysis, e.g., from about 50% to 99.5+%. Preferred polyvinyl alcohols have a degree of hydrolysis from about 80% to 99.5%. In general, a higher degree of hydrolysis, corresponds to better polarizer properties. Also, polyvinyl alcohols with a higher degree of hydrolysis have better moisture resistance. Higher molecular weight polyvinyl alcohols also have better moisture resistance, but increased viscosity. In the context of this invention, it is desirable to find a balance of properties in which the polyvinyl alcohol has sufficient moisture resistance, can be handled easily in a coating or casting process and can be readily oriented. Most commercial grades of poly(vinylalcohol) contain several percent residual water and unhydrolyzed poly(vinyl acetate).

Coating of the dispersion/solution may be accomplished by a variety of known methods, including, for example, coating the substrate using techniques, such as shoe coating, extrusion coating, roll coating, curtain coating, knife coating, die coating, and the like, or any other coating method capable of providing a uniform coating. The substrate may be coated with a primer or treated with a corona discharge to help anchor the polyvinyl alcohol film to the substrate. Suitable solution based primers are water-soluble copolyesters commonly used for priming polyethylene terephthalate films such as those described in U.S. Pat. No. 4,659,523. After coating, the polyvinyl alcohol film is dried at a temperature typically from about 100° C. to 150° C. The thickness of the dried coating may vary depending on the optical characteristics desired, but is typically from about 25 µm to 125 µm (1-5 mils).

In another approach, the vinylalcohol polymer layer may be melt-processed. As with solution coating, a melt comprising the vinylalcohol may be cast onto a substrate such as a carrier web or support layer. The vinylalcohol polymer film may also be melt-blown. The vinylalcohol polymer melt may also be coextruded with the substrate using a variety of equipment and a number of melt-processing techniques, typically extrusion techniques, well known in the art. For example, single- or multi-manifold dies, full moon feedblocks, or other types of melt processing equipment can be used, depending on the types of materials extruded.

Stretching Steps

The manufacture of an enhanced intrinsic polarizing sheet or film typically begins with a polymeric film of a hydroxylated linear high PVA-type polymer having an original length, and generally having a thickness on the order of 0.001 inches (25 µm) to 0.004 inches (100 µm). A suitable stretching device or other similar mechanism or system may be used to initially stretch the polymeric film from about 3.5 times to about 7.0 times the original length of the polymeric film or greater. The first stretching step is typically conducted at a temperature above the glass transition temperature of the polymeric material.

The film may be stretched in a gaseous medium, such as air, or in a liquid medium, such as deionized water or an aqueous dehydration catalyst. When stretching in a gaseous medium, the film may be heated to temperatures, for example, in excess of 300° F. When the film is stretched before being dipped into a liquid medium, the stretching step may be referred to as a "dry stretch."

When stretching in an aqueous medium, additional agents may be added to aid in the process, such as organic or inorganic salts, boric acid and/or borax, e.g., a surfactant, such as Triton X100 commercially available from Union Carbide, (Danbury, Conn.). Stretching in an aqueous medium may also allow undesirable elements, such as glycerin, to leach out of the polymer film.

When the film is stretched in a liquid medium, the stretching step may be referred to as a "wet stretch." The film may also be stretched after being removed from the liquid medium. The film typically has absorbed some of the liquid and dehydration catalyst, if present, and so the step of stretching after removing the film from the liquid medium may still be referred to as a "wet stretch."

Stretching may be effected by the provision of heat generating elements, fast rollers, and slow rollers. For example, the difference in the rotational rate between rollers may be exploited to create corresponding tension in the area of the sheet transported therebetween. When heat generating elements heat the sheet, stretching is facilitated and more desirably effected. Temperature control may be achieved by controlling the temperature of heated rolls or by controlling the addition of radiant energy, e.g., by infrared lamps. A combination of temperature control methods may be utilized.

In unidirectional orientation, the film may be stretched without lateral restraint from shrinking, or may be restrained from shrinking in the lateral direction. Such restraint may impose a small degree of bidirectional orientation to the film. For example, a film may be stretched in a down-web direction and its lateral width maintained constant using a tentering apparatus.

Stretching may be performed at various stages throughout the film manufacturing process. Stretching that occurs before conversion is referred to herein as a first stretching step, and may occur before the film is exposed to the dehydration catalyst, while the film is in the dehydration catalyst and/or after the film has been removed from the dehydration catalyst. Stretching that occurs simultaneously with conversion is referred to as a second stretching step and stretching that occurs after conversion, for example during or after a boration step, is referred to as a third stretching step.

Support Layer

It may be desirable to cast, laminate or otherwise affix the polymeric film onto a substrate such as a support film layer, heated roller, or carrier web. A support layer, when bonded or otherwise affixed to the polymer film provides mechanical strength and support to the article so it may be more easily handled and further processed. Some useful methods of using a support layer are described in U.S. Pat. No. 5,973,834 (Kadaba et al.), U.S. Pat. No. 5,666,223 (Bennett et al.) and U.S. Pat. No. 4,895,769 (Land et al.), the relevant portions of which are incorporated by reference.

If desired, the optional support layer may be oriented in a direction substantially transverse to the direction of orientation of the vinylalcohol polymer film. By substantially transverse, it is meant that the support layer may be oriented in a direction at least ±45° from the direction of orientation of the vinylalcohol polymer film layer. Such orientation of the support layer may provide greater strength in the transverse direction than is provided by an unoriented support layer.

In practice, the support layer may be oriented before or after attaching to the vinylalcohol polymer layer. In one embodiment, the vinylalcohol polymer may be oriented substantially uniaxially and bonded to an oriented support layer so that the directions of the orientations of the two layers are substantially transverse.

Any of a variety of materials can be used for the carrier web or support layer. Suitable materials include known polymeric sheet materials such as the cellulose esters, e.g., nitrocellulose, cellulose acetate, cellulose acetate butyrate, polyesters, polycarbonates, vinyl polymers such as the acrylics, and other support materials that can be provided in a sheet-like form. Polyesters are especially useful, depending on the particular application and the requirements thereof. A preferred polyester is polyethylene terephthalate, available under the Mylar and Estar tradenames, although other polyethylene terephthalate materials can be employed. In particular, one type of film that may be used as a support layer is the Vikuiti™ brand DBEF type of reflective polarizer film, available from 3M Company, St. Paul, Minn.

The thickness of the support material varies with the particular application. In general, from the standpoint of manufacturing considerations, supports having a thickness of about 0.5 mil (0.013 mm) to about 20 mils (0.51 mm) can be conveniently employed.

Polarizing sheets or films made according to the present invention may be laminated between or to supporting sheets or films, such as sheets of glass or sheets of other organic plastic materials, and that light polarizers of the present invention either in laminated or unlaminated form may be employed wherever other forms of light-polarizing plastic materials have been used, for example, in connection with sunglasses, sun visors, window pane glass, variable light transmission windows, glare masks, room partitions, and display devices such as liquid crystal display panels, emissive display devices, cathode ray tubes, or advertising displays.

Any of a variety of adhesives can be used for laminating the polarizing films onto other layers or substrates including polyvinyl alcohol adhesives and polyurethane adhesive materials. Inasmuch as the polarizer will normally be employed in optical applications, an adhesive material which does not have an unacceptable affect on the light transmission properties of the polarizer will generally be employed. The adhesive may, on the other hand, include a colorant to produce a desired color effect. The thickness of the adhesive material varies with application. In general, thicknesses of about 0.20 mil (0.005 mm) to about 1.0 mil (0.025 mm) are satisfactory.

Exposing Film to Dehydration Catalyst

The PVA-type film is subjected to a conversion step, which may take place before or after bonding the vinylalcohol polymer to a support layer, or without any support layer. In the conversion step, a portion of the vinyl alcohol polymer in the polymeric film is converted to polarizing molecules of block copolymers of poly(vinylene-co-vinyl alcohol). One approach to converting the vinyl alcohol is first to expose the vinyl alcohol film to a dehydration catalyst and then to heat the exposed film, thus causing dehydration to take place.

The film may be exposed to the dehydration catalyst in different ways. For example, the film may be dipped or immersed in an aqueous dehydration catalyst with sufficient residence time to allow the catalyst to diffuse into the film. Other methods might include exposing the film to acidic fumes containing the dehydration catalyst. Dipping the polymeric film potentially allows higher processing speeds to be attained than with an acid fuming process since diffusion of aqueous species is faster in solution than in the gaseous state. In addition, the catalyst can be introduced to both sides of the polymeric film when the film is dipped in the catalyst. When exposing the film to acidic fumes, on the other hand, the film is typically exposed only on one side. Accordingly, the dipping approach potentially provides a more uniform concentration of the catalyst in the polymeric film, which may impact the cross-sectional distribution of dehydration chain lengths in the resulting raw K film and provide a more balanced distribution of chains.

The dehydration catalyst may be any acid or other agent which is capable of effecting in the presence of heat or other appropriate processing condition the removal of hydrogen and oxygen atoms from the hydroxylated moieties of the linear polymer to leave conjugated vinylene units. Typical acids include hydrochloric acid, hydrobromic acid, hydroiodic acid, phosphoric acid, and sulphuric acid in methanol. The desired degree of dehydration may vary, depending on the desired contrast and the film thickness, but is typically in the range of 0.1 to 10%, preferably 1 to 5% of the available hydroxyl groups are converted to vinylene groups (i.e., —$CH_2$—CHOH—→—CH=CH).

For example, the polymeric film may be immersed in an aqueous hydrochloric acid solution for about one second to several minutes. In another example, the polymeric film may be immersed in deionized water for about one second to about five minutes and then immersed in an aqueous hydrochloric acid solution for about one second to several minutes. The concentration of the aqueous hydrochloric acid solution is preferably about 0.01 Normal to about 4.0 Normal.

The dehydration step may also be achieved by other methods, such as by coating the oriented sheet with an acid coating and then subjecting it to a heating step to effect the dehydration of the polymeric sheet, or by coating the oriented sheet with an acid donor layer. In the latter example, a photoacid generator or a thermal acid generator is dissolved or dispersed in the donor layer and, upon irradiation with a radiant energy, the incipient acid diffuses into the adjacent vinylalcohol polymer matrix to effect partial dehydration of the vinylalcohol polymer to conjugated vinylene [poly(acetylene)] segments. The radiant energy may be thermal energy or ultraviolet light energy, depending on the type of acid generator used.

Processing agents may be added to the acid to aid in the process, such as organic or inorganic salts, boric acid and/or borax, e.g., a surfactant, such as Triton X100 commercially available from Union Carbide, (Danbury, Conn.).

Conversion

After exposing the film to the dehydration catalyst, PVA-type film and the adsorbed catalyst may then be heated, whereby the oriented film is converted into the desired dehydration product, polyvinylene. The film may be heated through conduction heating, convection heating, radiation heating, or a combination thereof. The conversion process results in the converted film giving up water and the acid catalyst in the form of vapor.

For example, the polymeric film and the catalyst may be passed through a heating oven with a temperature range of from about 88° C. to about 205° C. for about a few seconds to about ten minutes. In another approach, the film and catalyst may be exposed to microwave radiation heating or to laser heating.

Another method of converting the film is to expose film and catalyst to radiant infrared heating, for example generated using an infrared heating lamp or lamps, from about one second to about sixty seconds. Infrared heating potentially allows higher processing speeds to be attained than with hot air impingement methods. In addition, infrared heating allows for a rapid startup and shutdown of the conversion process. Furthermore, when heating is effected using a number of radiant heaters placed across the film, it may be possible to achieve lanewise control of the conversion process by individually controlling the amount of radiation emitted from the different radiant heaters.

Variations in the temperature and duration of the dehydration heating step may affect the optical properties of the finished polarizer. Considerable latitude in process parameters exists without detriment to the formation of the copolymer and its concomitant polarization properties. There is a balance among time, temperature and acid concentration for a given optical property. For example, the extent of penetration of the acid into the film may be controlled by altering the temperature of the acid solution, altering the residence time of the film in the acid, and/or altering the concentration of the acid. For example, a lower transmission polarizer may be achieved at a given temperature by using longer immersion times. At a given immersion time, lower transmission may by achieved at higher temperatures. Generally, it is preferred that the diffusion of dehydration catalyst within the film reaches equilibrium. If a high transmission polarizer is desired, lower acid concentrations are preferred. If a lower transmission polarizer is desired then higher acid concentrations may be used.

The film may be subjected to a second stretching step during the conversion process. In other words, the film may be stretched a second time while the conversion process is occurring. This second stretching step may result in an increase in the film length by up to about 2.5 times the intermediate length of the film obtained after the first stretching step. Like the first stretching step, the second stretching step occurs at a temperature above the glass transition temperature of the polymeric material, and may be effected by the provision of heat generating elements, fast rollers, and slow rollers.

Boration

The polymeric film may also be subjected to a boration step following conversion, in which the oriented film is borated, for example by exposing the converted film to an aqueous boration solution. The boration step effects relaxation and cross-linking. A third stretching step may be carried out before, during, or after the polymeric film is borated. For example, the polymeric film may be submerged and allowed to soften and/or swell in an aqueous boration solution. This often results in relaxation, or shrinkage, of the film. The film is subsequently removed and dried. The film may receive a third stretch during and/or after drying following the boration step. In another approach, the polymeric film may be stretched when still submerged into the boration solution.

The boration step may employ one or more baths. For example, in a two-bath boration treatment, the first bath may contain water, and the second, a boric ion contributing species. The order of the baths may be reversed or both baths may contain varying concentrations and/or mixtures of boric ion contributing species. Stretching and/or relaxation of the polymeric film may be conducted in any one or more of these baths.

The boration solution generally comprises boric acid. In addition, the boration solution may comprise either sodium or potassium hydroxide, or may include a substance from the class consisting of the sodium and potassium borates, preferably borax. The concentration of boric acid and borax or other borate in the solution or solutions to which the oriented polarizing film is subjected may vary. Preferably, the boric acid is present in a higher concentration than the borax or other borate, and the solutions may contain from about 5% to about 20% by weight of boric acid and from 0% to about 7% by weight of borax. A preferred concentration ranges from about 6%-16% by weight of boric acid and from 0%-3% by weight of borax.

The polarizing sheets or films may be immersed in a boration solution or solutions for a period of about one minute to about thirty minutes and preferably maintained at about 50° C. or higher. A preferred boration temperature ranges from about 70° C. to about 110° C. Boration of the molecularly oriented polymeric film is subject to considerable variation. For example, the temperature of the boration solution may be varied, and the concentration thereof may be increased at higher temperatures. It is desirable that the solution be heated to at least 50° C. or greater in order to accomplish rapid "swelling" and cross-linking of the sheet.

Following exposure to the boron-containing solution, the polarizing sheet may be rinsed and dried. The sheet may be rinsed using any suitable method, such as passing the sheet through a bath of de-ionized water, or by spraying de-ionized water on the sheet. The sheet may be dried by heating the sheet, for example through convection or radiation heating. In one approach, the sheet may be passed through a convection oven.

Processing agents may be added to the boration bath to aid in the process, for example, a surfactant such as Triton X100 commercially available from Union Carbide, (Danbury, Conn.).

The polarizing sheet typically shrinks during the boration step, if not left under tension. Allowing the polarizing sheet to shrink permits the polarizer sheet to take up more boron-containing solution, and thus leads to a higher degree of cross-linking, with a concomitant increased environmental stability. The polarizing sheet may be restretched after boration. For example, the sheet may be stretched in a third stretching step up to about 120% of the shrunk length. The restretching may be performed while the sheet is still in the boration bath or after it has been removed from the boration bath. For example, if the boration step is followed by rinsing and drying, the restretch may take place in a deionized rinsing bath or while being dried.

Subsequent to the second stretching step and/or boration step, the resulting intrinsic polarizer may be bonded or laminated to an optional support layer. The optional layer may be the same or different from an optional support layer previously stripped off.

The process of wet-stretching, conversion and boration can be applied to the PVA-type film as a continuous, integrated process. Such a continuous process is simpler than the multistep processes that have been used for intrinsic polarizers in the past, and leads to higher film yield and reduced polarizer cost.

To further illustrate the present invention, the following Examples are provided, but the present invention is not to be construed as being limited thereto. Unless otherwise indicated, all parts, percents and ratios are by weight. In the Examples, unpolarized light transmission was measured on the raw K samples by passing a beam of white light through the sample, through a photopic filter, and then through a photo-detector. Unpolarized light transmission on raw K samples for an intrinsic polarizer typically ranges from 15% to about 50%. The polarizing efficiency was calculated according to the following equation by determining the transmittance with axes parallel ($T_{par}$) which was determined by overlapping the sample polarizer with the high efficiency polarization analyzer in such a manner as to make the axes thereof parallel with each other, and the transmittance with axes crossed ($T_{perp}$), which was determined by overlapping the same in such a manner as to make the axes at right angles to each other:

$$\text{Polarizing efficiency}, \eta(\%) = (T_{par} - T_{perp})/(T_{par} + T_{perp}) \times 100 \quad (3)$$

Unless otherwise indicated, all Examples used an aqueous boration solution having a 9%-12% boric acid concentration and a 3% borax concentration.

EXAMPLE 1

Birefringent Characteristics

Four samples of PVA-type film were stretched by different amounts, as listed in Table I. These samples were prepared for measuring the birefringence that results from the orientation of the PVA molecules when the PVA film is stretched. As can be seen, the amount of birefringence, which is related to the degree of orientation, increases with increased stretching. Also, the film become thinner with increased stretching.

TABLE I

| Sample | Stretch (%) | Birefringence | Thickness (μm) |
|---|---|---|---|
| 1 | 400 | 0.0337 | 31.4 |
| 2 | 650 | 0.0400 | 23.9 |
| 3 | 750 | 0.0418 | 21.1 |
| 4 | 850 | 0.0438 | 17.8 |

Each film was 2400 DP PVA, available from Kuraray Co. Ltd., Osaka, Japan., contained about 12% glycerin plasticizer and, before stretching, had a thickness of 75 μm and a width of 26" (66 cm). All samples were stretched by 400% in a first, wet stretch step, and were then subsequently stretched by different amounts in a second stretch step under IR illumination. For Samples 1-4, the wet stretch took place in deionized water, with no acid present. Accordingly, there was no dehydration catalyst, and so no conversion took place when the film was exposed to the IR lamp. In all cases, the IR lamp was a Protherm Infrared Heater, FS Series, medium wavelength, available from Process Thermal Dynamics, Inc., Brandon, Minn., unless indicated otherwise. The conditions under which Samples 1-4 were made are listed in Table II.

TABLE II

Sample Manufacturing Conditions

| | Sample No. | | | |
|---|---|---|---|---|
| | 1 | 2 | 3 | 4 |
| Input line speed (cm/s) | 0.5 | 0.25 | 0.25 | 0.25 |
| Water bath temperature (° C.) | 36.7 | 36.7 | 36.7 | 36.7 |
| Wet Stretch (1st step, %) | 400 | 400 | 400 | 400 |
| Water bath path length (cm) | 86 | 86 | 86 | 86 |
| IR lamp temperature (° C.) | 445 | 550 | 563 | 568 |
| IR filament, distance from film (cm) | 20 | 20 | 20 | 20 |
| IR lamp length (cm) | 25 | 25 | 25 | 25 |
| Reflector distance from film (cm) | 7.5 | 7.5 | 7.5 | 7.5 |
| IR stretch (2nd step, %) | 100 | 163 | 187 | 213 |
| Total stretch (%) | 400 | 650 | 750 | 850 |

Apart from Sample 1, all samples had an input line speed of 0.25 cm/sec, corresponding to 0.5 feet/minute. Sample 1 was transported twice as fast, with a line speed of 0.5 cm/sec (1 foot/minute). The film was passed into a water bath held at a temperature of 36.7° C. The path length in the water was 86 cm (34 in). The samples were each stretched by 400% in the water. A value of stretch indicates the ratio of the length after stretching to the length before stretching. Thus, a stretch of 400% indicates that a length of 1 unit of film was stretched to a length of 4 units.

The films were then removed from the water tank and exposed to IR light from an IR lamp whose temperature could be adjusted. The IR lamp had a reflector behind the heating element to reflect heat to the film. In all cases the distance between the reflector and the film was 7.5 cm. The different samples were stretched by different amounts when exposed to the IR lamp. Sample 1 was not stretched when exposed to the IR lamp, as indicated by the stretch amount of 100%. The films were unsupported during the wet stretch and IR stretch steps.

EXAMPLE 2

Polarization Characteristics

Four more samples were prepared for measuring how the polarization performance of the film is dependent on the amount of stretching.

TABLE III

| Sample | Stretch (%) | Kv (%) | Pol. eff. (%) | D |
|---|---|---|---|---|
| 5 | 400 | 42.4 | 98.13 | 51.6 |
| 6 | 650 | 42.3 | 99.88 | 87.5 |
| 7 | 750 | 42.5 | 99.96 | 107.4 |
| 8 | 850 | 42.5 | 99.94 | 101.7 |

Samples 5-8 were prepared like Samples 1-4 in Example 1 above, except that the water bath contained acid. Therefore, for Samples 5-8, the exposure to the IR lamp resulted in conversion of the film. The transmission for upolarized light (Kv) was calculated from transmission measurements through the films made using a spectrophotometer (Cary Model No. 5E). Kv is the average transmission through the film of light polarized parallel to the transmission axis ($T_{par}$) and of light polarized perpendicular to the transmission axis ($T_{perp}$). The polarizing efficiency was calculated using expression (3) provided above.

The dichroic ratio, D, was defined in expression (1) above. The results listed in Table III show that the polarization coefficient and the dichroic ratio generally increase for increased amounts of stretching, while maintaining a substantially constant value transmission for light in the pass polarization state. The values of polarization coefficient and dichroic ratio for Sample 8, however, are a little less than those for Sample 7. The conversion conditions and boration step conditions affect the optical characteristics of the resultant polarizer film. The conversion and boration conditions for Sample 8 had not been optimized. It is believed that the polarization performance of a film stretched by 850% may be increased with optimization of boration conditions.

The polarization efficiencies of Samples 7 and 8 are both high, in excess of 99.94%, and the dichroic ratios are both higher than 100. Thus the polarization properties of Samples 7 and 8 are significantly improved over previously obtained values for KE polarizers.

The conditions under which Samples 5-8 were made are listed in Table IV.

TABLE IV

Sample Manufacturing Conditions

| | Sample No. | | | |
|---|---|---|---|---|
| | 5 | 6 | 7 | 8 |
| Input line speed (cm/s) | 0.5 | 0.25 | 0.25 | 0.25 |
| Water bath temperature (° C.) | 31 | 37.8 | 35 | 35 |
| Wet Stretch ($1^{st}$ step, %) | 400 | 400 | 400 | 400 |
| Water bath path length (cm) | 86 | 250 | 86 | 86 |
| IR lamp temperature (° C.) | 445 | 550 | 560 | 570 |
| IR filament, distance from film (cm) | 20 | 20 | 20 | 20 |
| IR lamp length (cm) | 25 | 25 | 25 | 25 |
| Reflector distance from film (cm) | 7.5 | 7.5 | 7.5 | 7.5 |
| IR stretch ($2^{nd}$ step, %) | 100 | 163 | 187 | 213 |
| Boration tank temperature (° C.) | 85 | 87.8 | 90.5 | 93.3 |
| Boric acid conc. (%) | 11.25 | 11.9 | 11.2 | 11.2 |
| Sodium borate decahydrate (borax) conc. (%) | 3.0 | 3.0 | 3.0 | 3.0 |
| Boration relax (%) | 0 | 5 | 10 | 13 |
| Restretch ($3^{rd}$ stretch) during rinse and dry (%) | 108 | 106 | 106 | 106 |
| Total stretch (%) | 430 | 655 | 720 | 790 |

After the second stretch step, during conversion, the films were placed into a boration bath containing boric acid and sodium borate decahydrate ($Na_2B_4O_7 \cdot 10H_2O$, also known as borax). The films were permitted to relax in the boration bath, resulting in a shrinkage of as much as 13% in length. The films were rinsed in water and dried in a convection oven after being removed from the boration bath. The films were restretched ($3^{rd}$ stretch step) during the rinse and dry process. The films were unsupported by a support layer throughout the fabrication process.

EXAMPLE 3

Color Characteristics

Figure 2:
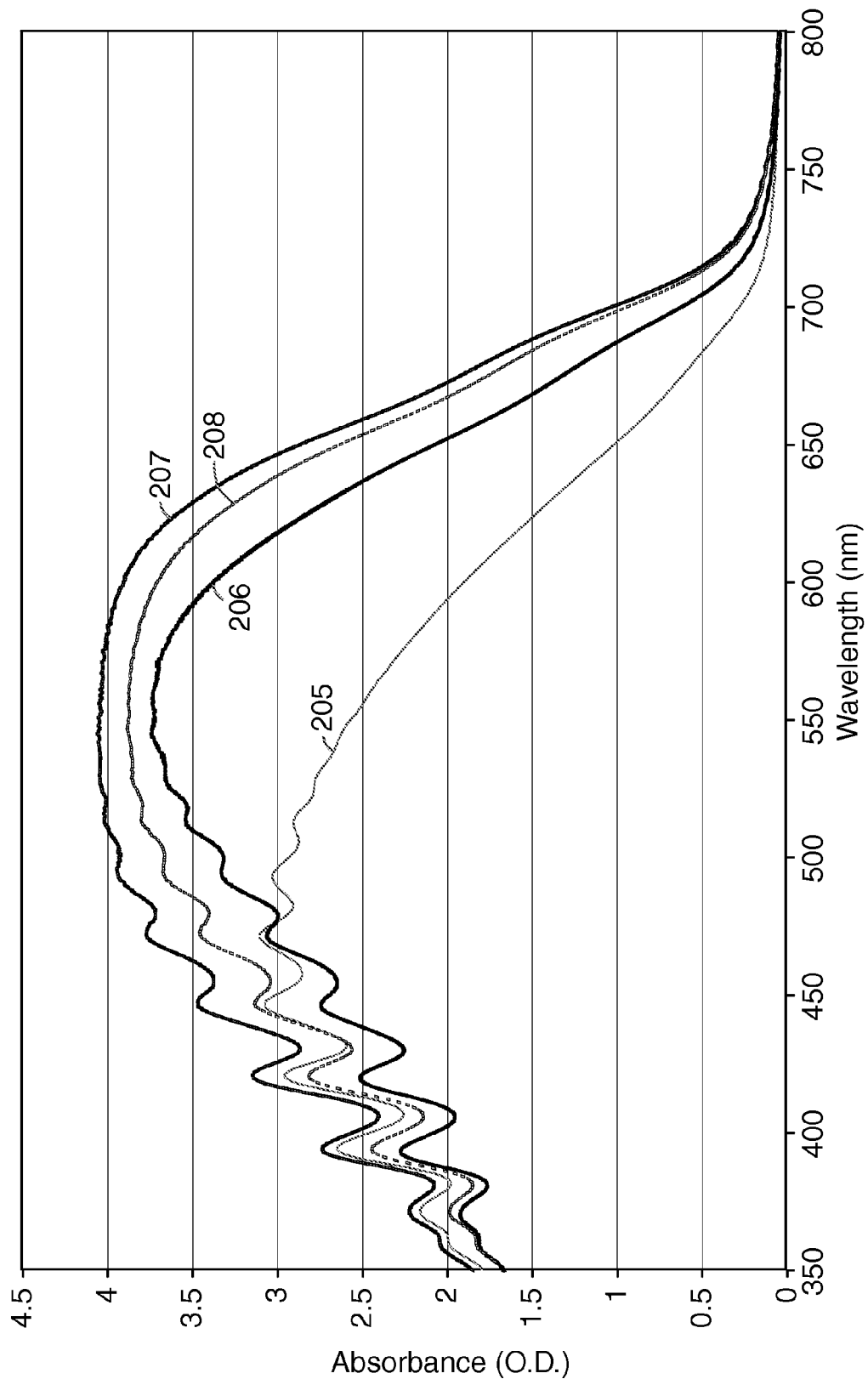
FIG. 2 presents a graph showing the absorption spectra for Samples 5-8 discussed in Examples 2 and 3.
Figure 3:
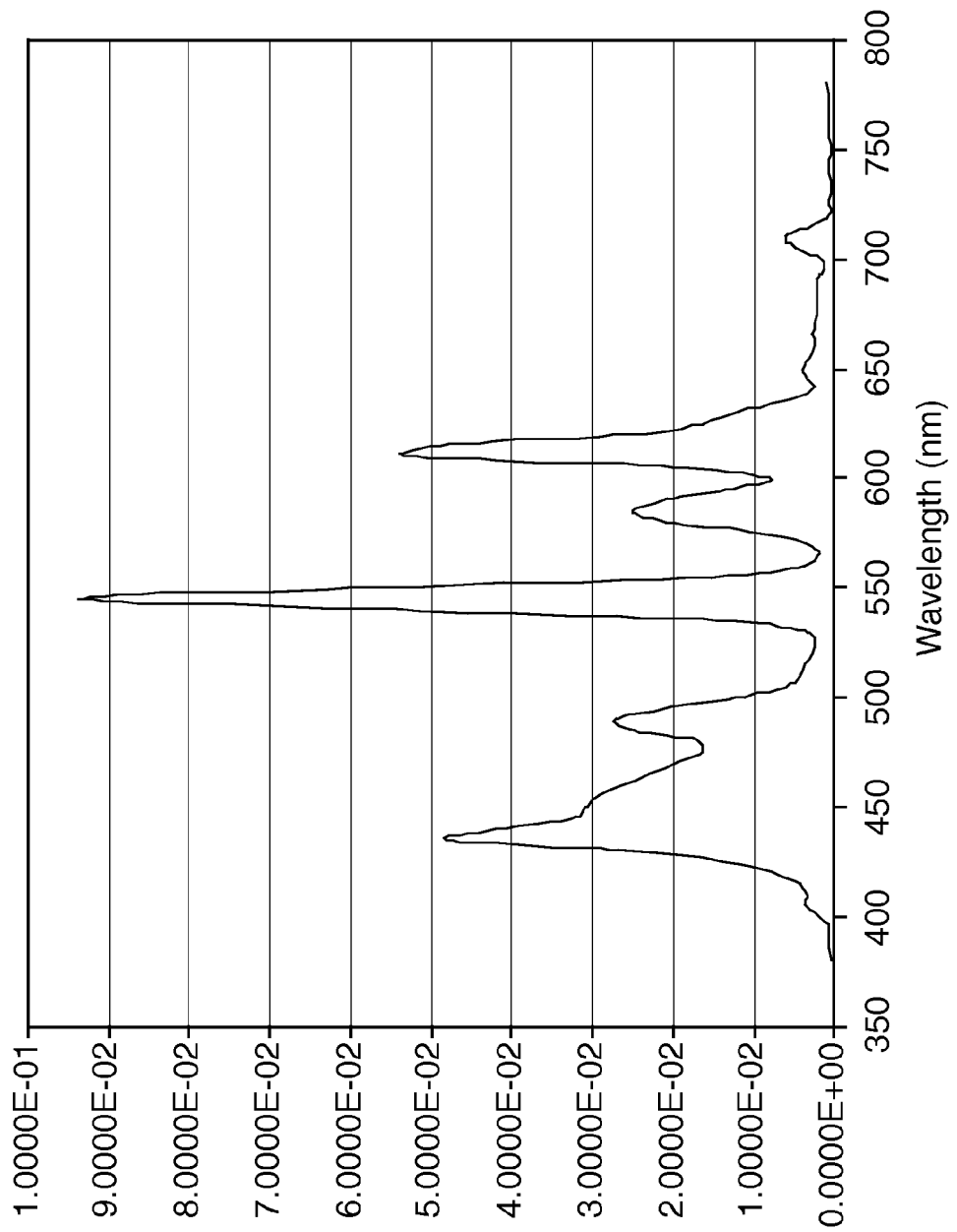
FIG. 3 presents a graph showing the standard spectrum for a cold cathode fluorescent tube (CCFT)

The color characteristics of Samples 5-8 were calculated for light transmitted through a single layer and also for a light transmitted through a pair of crossed layers (transmission axes perpendicular), using the wavelength dependent absorbance measurements made using the using the spectrophotometer. The absorbance spectra for the different samples are shown in FIG. 2. The absorbance spectra for Samples 5-8 are respectively labeled as curves 205, 206, 207 and 208 in FIG. 2. The hue of the transmitted light was subsequently calculated, and is listed in Table V. Unless otherwise stated, the hue is calculated for illumination using a cold cathode fluorescent tube (CCFT), as is commonly used in LCD displays for e.g. laptop computers. The spectrum of the CCFT source is presented in FIG. 3, normalized so that the total intensity integrated over the wavelength range shown, the area under the curve, is equal to one. Color, or hue, is presented according to the CIELAB color system, which uses three co-ordinates: L*, a* and b*. The L* co-ordinate is related to lightness, the a* co-ordinate represents red/green color and the b* co-ordinate represents yellow/blue color. A positive value of a* corresponds to red and a negative value of a* corresponds to green. A positive value of b* corresponds to yellow and a negative value of b* corresponds to blue. The(a*,b*) co-ordinate of (0,0) represents a neutral hue, black, grey or white, depending on the value of the L* co-ordinate. Furthermore, a value of a* or b* whose magnitude is less than 1 results in a barely perceptible change in color from neutral. The color characteristics are presented for a single sheet, for a pair of sheets oriented with the transmission axes parallel and for a pair of sheets with the transmission axes crossed.

TABLE V

| | Color Characteristics | | | | | |
|---|---|---|---|---|---|---|
| Sample | Single a* | Single b* | Parallel a* | Parallel b* | Crossed a* | Crossed b* |
| 5 | −0.891 | 8.593 | −2.410 | 15.081 | 16.978 | 8.834 |
| 6 | −0.160 | 4.720 | −0.261 | 9.045 | 2.475 | −2.252 |
| 7 | −0.501 | 3.475 | −0.853 | 6.544 | 0.556 | −0.461 |
| 8 | −0.113 | 3.219 | −0.113 | 6.140 | 1.025 | −1.074 |

Sample 5 has relatively poor color characteristics, since the values for a* in the crossed configuration and for b* in both configurations are so large. Samples 6-8, on the other hand have significantly improved color characteristics. Both Samples 7 and 8 show values of a* and b* whose magnitudes are less than 2 and, in fact, are less than 1, for Sample 7 in the crossed configuration. Sample 7, in particular, shows a neutral hue in the crossed configuration and a slightly blue hue in the single layer configuration. In addition, Sample 8 shows a substantially neutral hue in the crossed configuration and a more neutral hue in the single layer configuration than Sample 7. In the parallel configuration, both Samples 7 and 8 show a hue of less than one a* unit, and show reasonable magnitudes of b* of less than 7. These color characteristics are relatively neutral because the concentration of conjugated vinylene blocks is relatively constant over a large range of n, where n is the number of vinyl units conjugated in the polyvinylene block, as is discussed in U.S. patent application Ser. No. 10/277,252, incorporated herein by reference.

Samples 7 and 8, therefore, provide excellent polarization characteristics, as listed in Table III, while also providing excellent color characteristics. Such color neutrality has not previously been obtainable in intrinsic K-type polarizers of high polarization quality without the aid of extrinsic chromophores such as dyes.

EXAMPLE 4

Uniformity of Polarization and Color Characteristics

The uniformity of the optical characteristics across the film (cross-web) was measured for a film made under the conditions listed above for Sample 7, i.e. a total stretch of 720%. The stretched film had a width of about 9 inches (23 cm). The transmission, Kv, polarizing co-efficiency, dichroic ratio and color were measured at steps of one inch (2.5 cm) from one of the edges of the film. The results are shown in Tables VI and VII.

TABLE VI

| Polarization Characteristics vs. Film Position | | | |
|---|---|---|---|
| Distance from edge (cm) | Kv (%) | Polarizing co-efficiency (%) | D |
| 2.5 | 42.3 | 99.95 | 97.4 |
| 5 | 42.9 | 99.96 | 92.5 |
| 7.5 | 41.9 | 99.96 | 90.8 |
| 10 | 42.3 | 99.96 | 98.6 |
| 12.5 | 42.2 | 99.96 | 97.3 |
| 15 | 42.4 | 99.96 | 103.4 |
| 17.5 | 42.4 | 99.95 | 101.6 |
| 20 | 42.7 | 99.92 | 103.2 |

Figure 4:
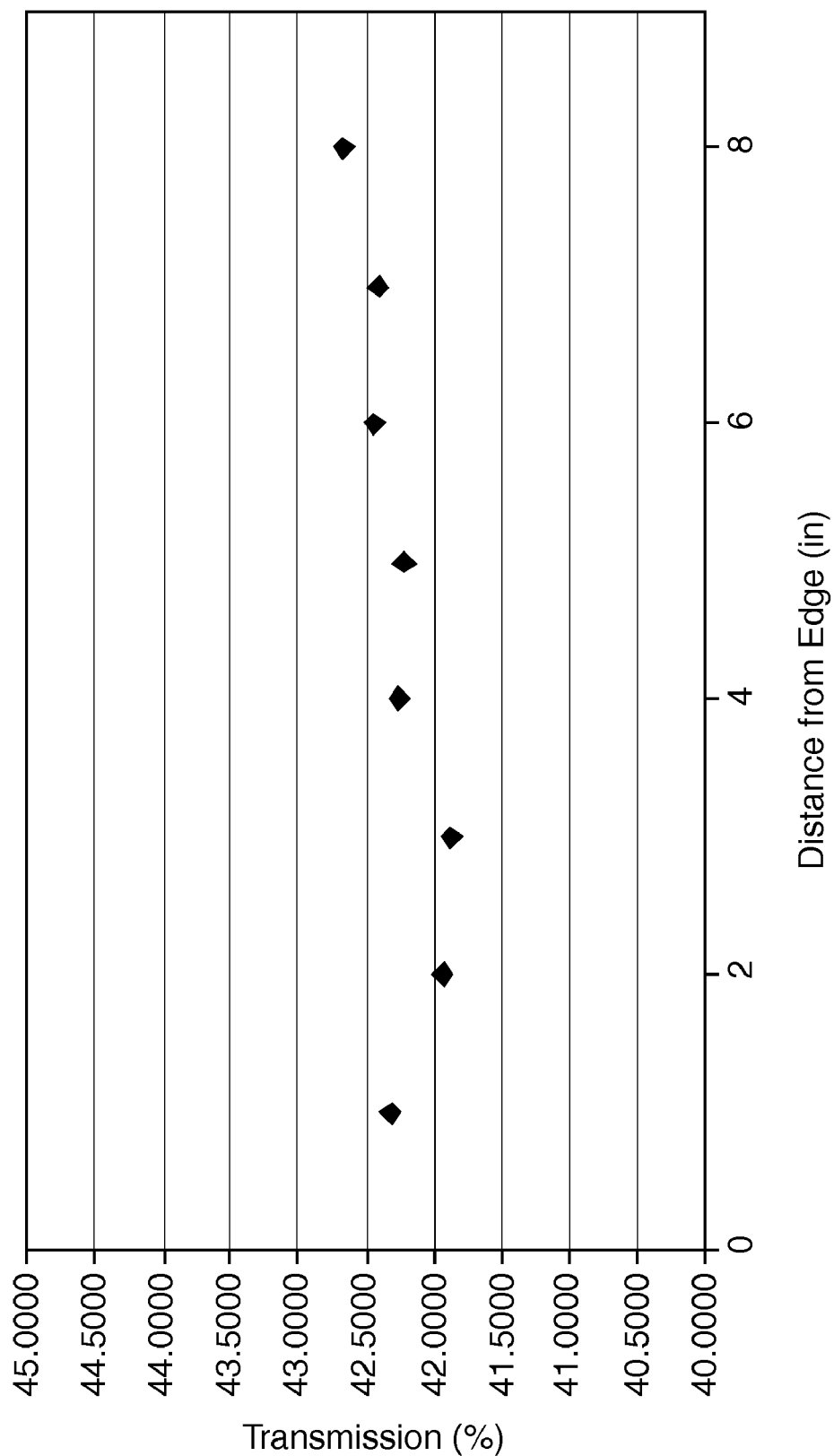
FIG. 4 presents a graph showing transmission of light as a function of position across the polarizer for a sample polarizer manufactured according to principles of the present invention.

The values for Kv are also shown in the graph presented in FIG. 4. Kv varies by about ±0.6% across the width of the film. The polarizing efficiency varies by about ±0.02% across the film and the dichroic ratio varies by about ±5 across the film. The variation in the polarization characteristics across the film is relatively small.

TABLE VII

| Color Characteristics vs. Film Position | | | | |
|---|---|---|---|---|
| Distance from edge (cm) | Single a* | Single b* | Crossed a* | Crossed b* |
| 2.5 | −0.188 | 2.603 | 0.918 | −1.235 |
| 5 | −0.252 | 3.233 | 0.438 | −0.426 |
| 7.5 | −0.465 | 3.499 | 0.425 | −0.352 |
| 10 | −0.433 | 3.417 | 0.594 | −0.460 |
| 12.5 | −0.404 | 3.655 | 0.537 | −0.395 |
| 15 | −0.518 | 3.854 | 0.555 | −0.279 |
| 17.5 | −0.466 | 4.073 | 0.565 | −0.234 |
| 20 | −0.4101 | 3.506 | 0.952 | −0.680 |

The color characteristics vary by only small amounts over the film. For example, other than one value close to the edge, all the hues in the crossed configuration have a magnitude of less than one, which is minimally perceptible to the human eye, if perceptible at all. The only value greater than one, (b* at 2.5 cm from the edge) is greater than one by only a small amount, and is barely perceptible to the human eye. In the single layer configuration, the magnitudes of a* all remain less than one, while the magnitudes of b* vary between 2.603 and 4.073.

EXAMPLE 5

IR Lamp Temperature

The effect of the lamp temperature on polarization and color characteristics was investigated. Samples 9-12 were fabricated under the same conditions as listed above for Sample 7, except that the lamp temperature was varied and the boration conditions were: boric acid concentration ~9.5% and sodium borate decahydrate concentration ~3%.

Figure 5:
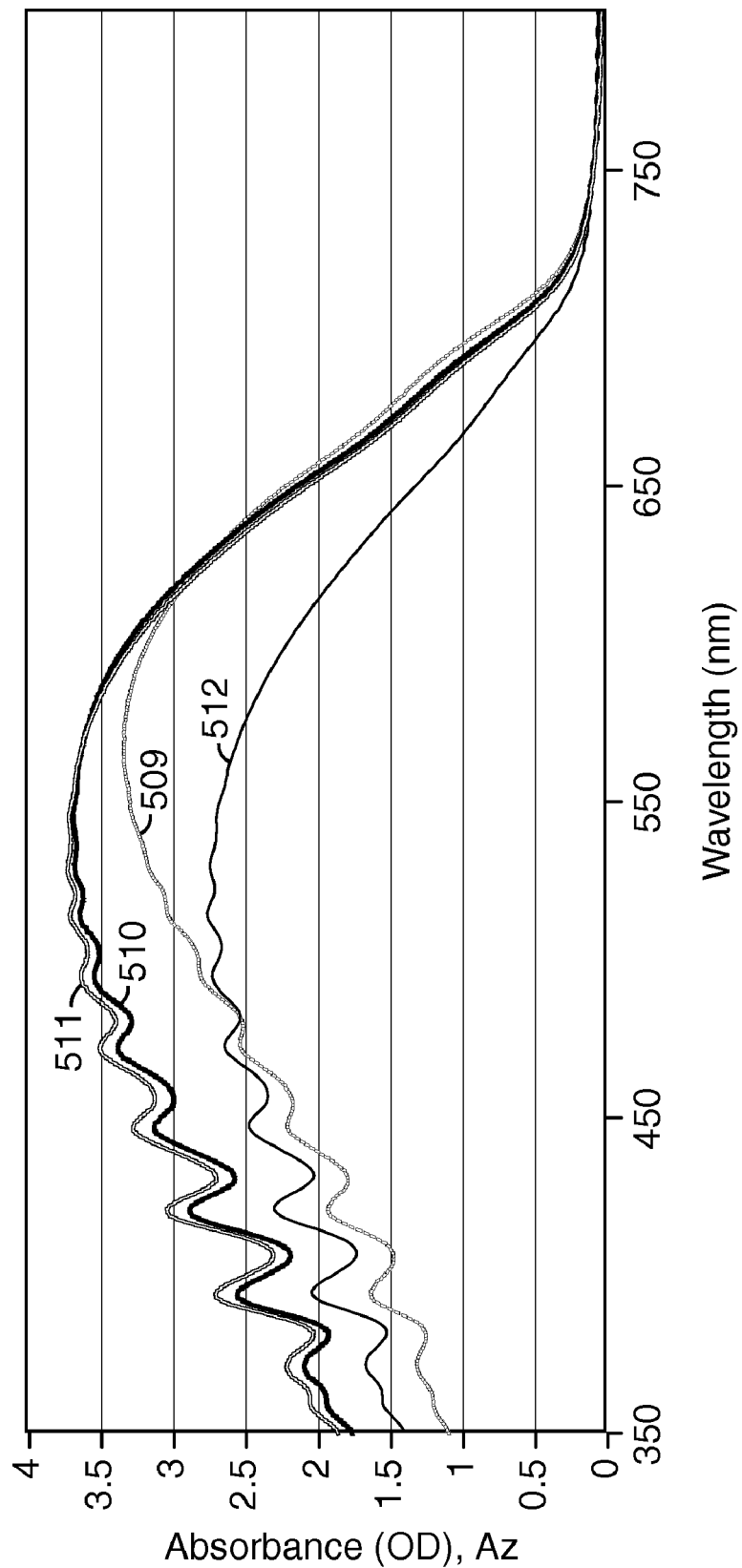
FIG. 5 presents a graph showing absorption of light in a polarizer as a function of wavelength for polarizers converted under different conditions.
Figure 6:
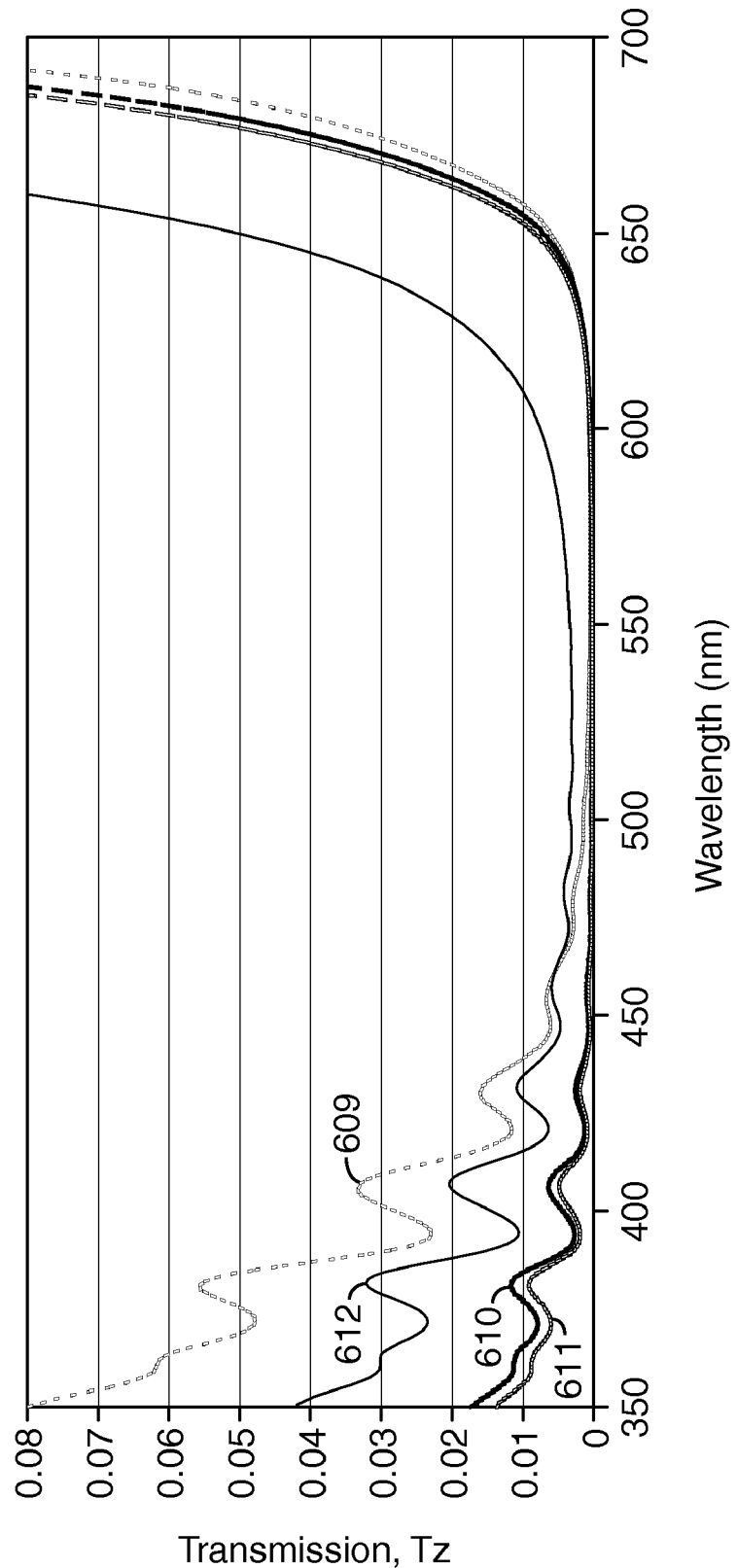
FIG. 6 presents a graph showing transmission of light as a function of wavelength through a single polarizer layer for different polarizers converted under different conditions.

The absorbance (optical density) and transmittance of the different polarizer sheets were calculated from measurements made using the dual beam spectrophotometer. The resulting absorbance and transmittance for single polarizer sheets are shown in FIGS. 5 and 6 respectively. The absorbance is the intrinsic absorbance, and results from intrinsic absorption by the polyvinylene blocks in the film itself, and not from absorption of species added to the film, such as iodine or dye. The absorbance curves for samples 9-12 are labeled in FIG. 5 as curves 509. 510, 511 and 512 respectively. Also, the transmission curves in FIG. 6 for samples 9-12 are labeled respectively as curves 609, 610, 611 and 612.

The absorbance for Samples 10 and 11 is particularly high in the blue region of the spectrum, a region of the spectrum that has previously seen relatively low absorbance for K-type polarizers using previous methods of construction. In particular, the ratio, R, of the absorbance at 550 nm over the absorbance at 400 nm is around 1.54, showing that the absorbance at the blue end of the spectrum is around two-thirds of the absorbance in the middle of the spectrum. Thus, Samples 10 and 11 both show that the ratio, R, is less than 2, and is less than 1.7.

Figure 7:
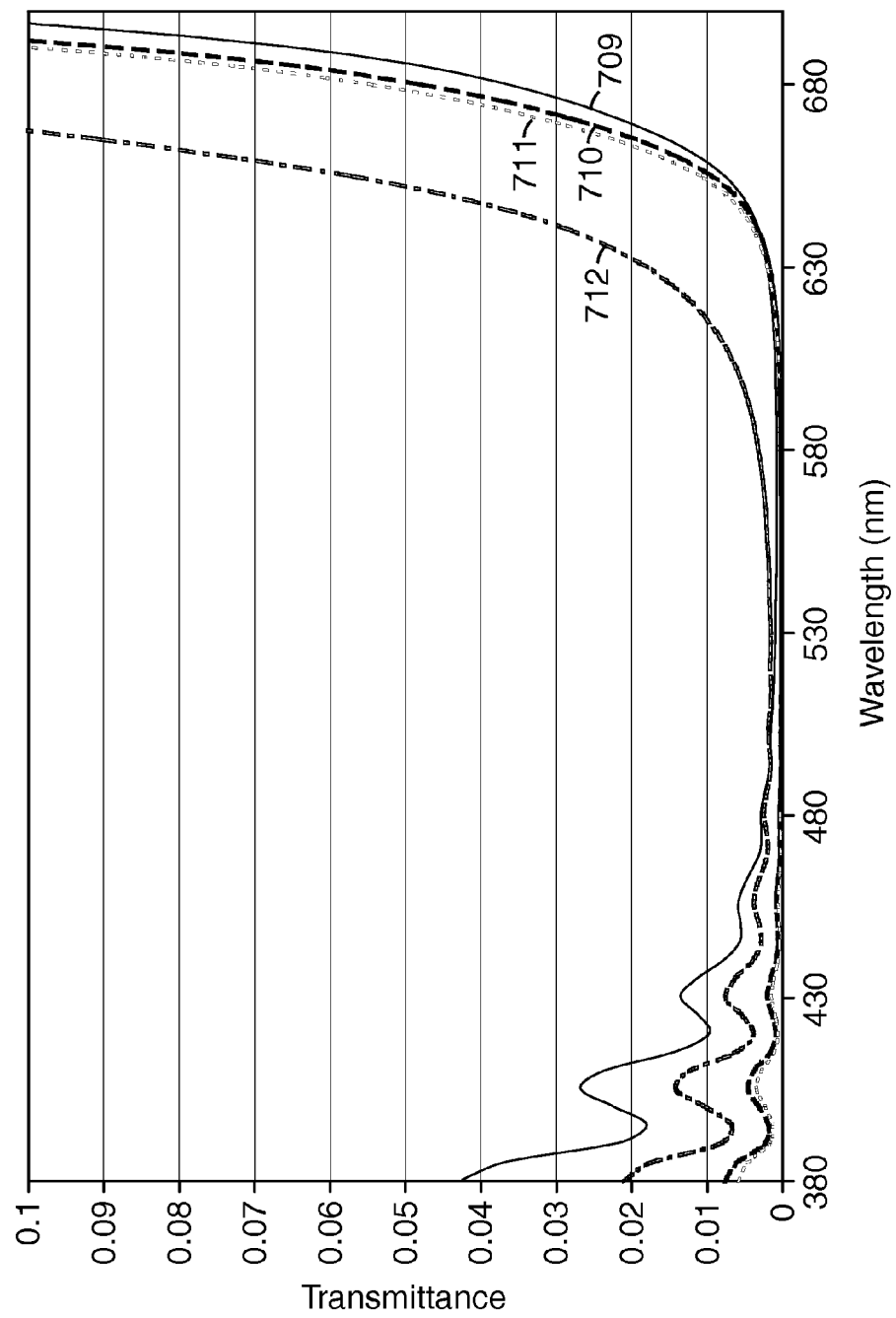
FIG. 7 presents a graph showing transmission through a pair of crossed polarizers for different polarizers converted under different conditions.
Figure 8:
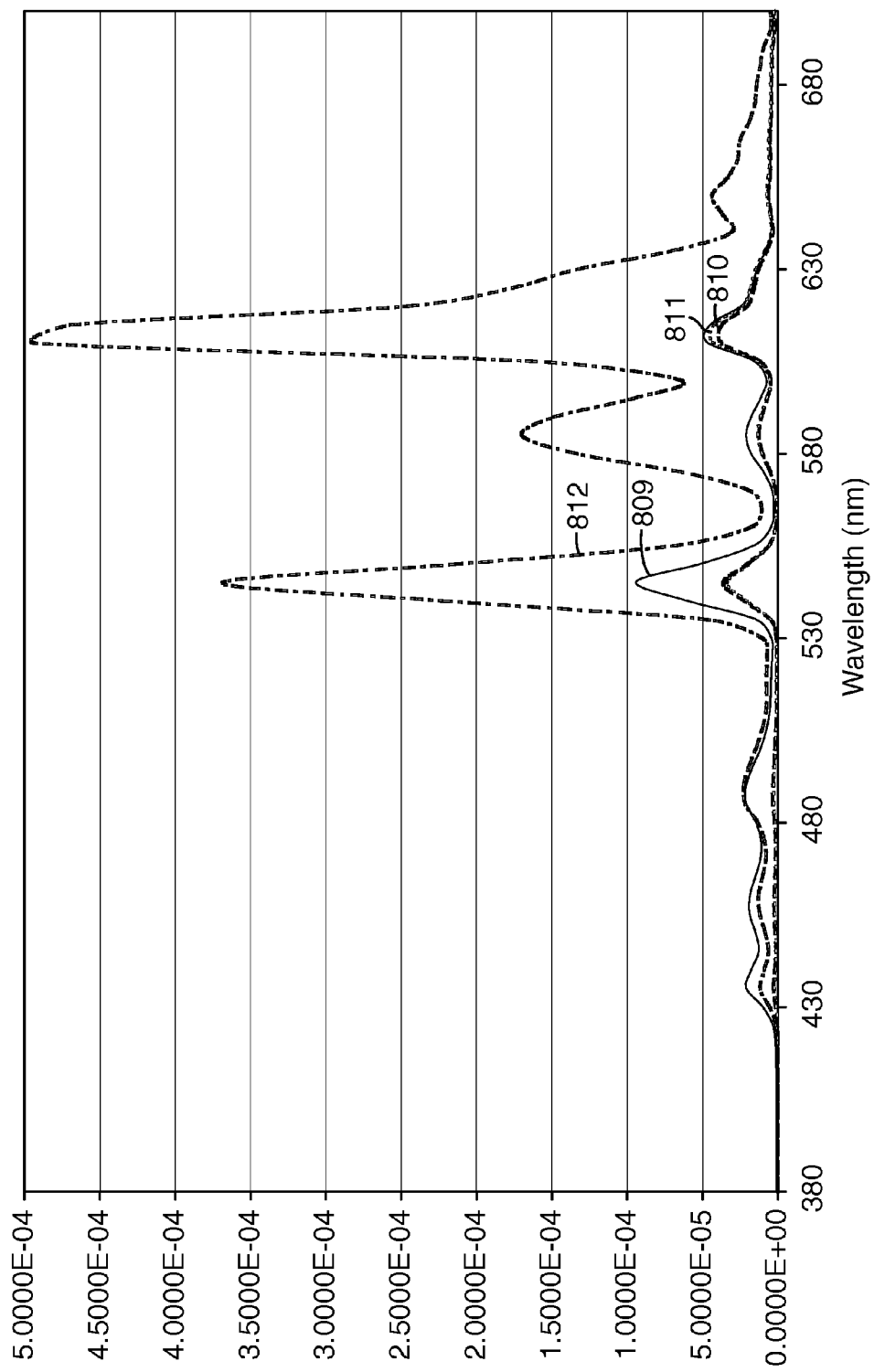
FIG. 8 presents a graph showing the transmission through the crossed polarizers of FIG. 7, for light emitted from a CCFT light source having an emission spectrum as shown in FIG. 3, and photopically corrected for the response of the human eye.

The transmission through a pair of crossed polarizer sheets is shown in FIG. 7 for the different polarizer samples. The transmission curves for samples 9-12 are labeled respectively as curves 709, 710, 711 and 712. The transmission plotted on the y-axes in FIGS. 6 and 7 is the absolute value of transmittance. Thus, a transmission value of 0.1 indicates that 10% of the incident light is transmitted through the polarizers. When the data of FIG. 7 are convoluted with a CCFT light source, whose spectrum is given in FIG. 3, and photopically corrected for the response of the human eye, the transmission spectrum of the crossed polarizers is as shown in FIG. 8. The photopically corrected transmission curves for samples 9-12 are respectively labeled as curves 809, 810, 811 and 812 in FIG. 8.

The polarization characteristics for Samples 9-12 are shown in Table VIII, the transmission characteristics are given in Table IX and the color characteristics are given in Table X.

TABLE VIII

Polarization Characteristics

| Sample | Lamp temp. (° C.) | Polarizing co-eff. (%) | D | Contrast Ratio |
|---|---|---|---|---|
| 9 | 550 | 99.79 | 98.6 | 463 |
| 10 | 560 | 99.89 | 115.7 | 914 |
| 11 | 570 | 99.89 | 116.0 | 873 |
| 12 | 580 | 98.94 | 76.6 | 93 |

The contrast ratio is defined as the ratio of the parallel transmission over the crossed transmission, listed below in Table IX. It should be noted that, concomitant with the relatively low value of R, the polarizing efficiency exhibited by Samples 10 and 11 is greater than 99.8%, while the dichroic ratio, D, for both samples was greater than 110.

TABLE IX

Transmission Characteristics (%)

| Sample | Single (Kv) | Parallel | Crossed |
|---|---|---|---|
| 9 | 43.0 | 36.9 | 0.0796 |
| 10 | 43.2 | 37.3 | 0.0408 |
| 11 | 43.2 | 37.3 | 0.0427 |
| 12 | 43.2 | 37.0 | 0.3946 |

The transmission characteristics are integrated over the visible spectrum for the polarizers illuminated with the CCFT standard light source and photopically corrected for the response of the human eye. The values of crossed transmission correspond to the areas under the curves shown in FIG. 8.

TABLE X

Color Characteristics

| Sample | single a* | single b* | par. a* | par. b* | crossed a* | crossed b* |
|---|---|---|---|---|---|---|
| 9 | 0.117 | 1.311 | −0.210 | 3.253 | 5.509 | −8.814 |
| 10 | −0.651 | 3.793 | −1.206 | 7.200 | 1.602 | −0.780 |
| 11 | −0.720 | 4.022 | −1.317 | 7.589 | 1.590 | −0.374 |
| 12 | −0.034 | 3.210 | −0.771 | 6.127 | 10.207 | −0.037 |

The color characteristics listed in Table X correspond to the calculated hues produced under illumination by light from the standard CCFT light source that has passed through the particular polarizer configuration. Thus, "single" refers to the hue of the light that is transmitted through a single layer of the polarizer sample, "par." refers to the hue of the light that has passed through a stack of two layers of the polarizer sample with the transmission axes parallel, and "crossed" refers to the hue of the light that has passed through a stack of two layers of the polarizer sample whose transmission axes are perpendicular.

As can be seen from inspection of Tables VIII-X, and FIGS. 5-8, the performance of the polarizer peaks when the lamp temperature used in this particular manufacturing process is in the region of 560° C.-570° C. Of particular note is the performance of the polarizer in the blue portion of the spectrum. Previously, high values of $A_z$ and low values of $T_z$ in the blue portion of the spectrum were not achieved with intrinsic polarizers. The processes of wet stretching and simultaneous stretching and conversion result in improved blue performance, with low transmittance and high absorbance. The absorbance is greater than 2 through the blue region (400 nm-500 nm), and is greater than 3 for some wavelengths in the range 400 nm-450 nm. Accordingly, the change is color when used in a crossed configuration is relatively small. In particular, Samples 10 and 11 both exhibit values of a* and b* whose magnitudes are less than 2, and the value of b* is less than 1.

Lamp temperatures outside of the range 560° C.-570° C. resulted in increased blue transmission, for example as is shown in FIG. 6 for the curves corresponding to a lamp temperature of 550° C. and 580° C. This increased transmission may indicate that the number of shorter vinylene blocks (low n) being conjugated during the conversion process is less than at temperatures around 560° C.-570° C. Furthermore, at higher than optimal temperatures, e.g. 580° C., there is increased transmission of light in the red region of the spectrum. This is shown in the departure of the curves corresponding to 580° C. from the other curves in the region of 600 nm-700 nm. This may indicate that the number of longer vinylene blocks (high n) being conjugated is reduced when the temperature is higher than optimum.

EXAMPLE 6

Control of "Blue Leak"

Traditional methods of preparing K-type polarizers suffer from a so-called "blue-leak", in the crossed state absorption spectrum, where absorbance drops to relatively low values for wavelengths below about 450 nm. The currently accepted way of increasing the blue absorption is to add a blue-absorbing dye to the intrinsic polarizing film. The data presented under Example 5, however, suggest that the blue absorption can be controlled to some extent by the temperature and power of the IR lamp used in the conversion process. Thus, use of the manufacturing process discussed above provides the ability to control the yellow-blue, or b*-axis, color of the resulting polarizer film. This is due to the modulation of the dehydration chain length distribution of the chromophore in the film, with a larger relative ratio of short chain lengths (low n) providing the increase in blue absorption.

Since there is no requirement to add a blue absorbing dye, it is easier to control the manufacture of the resulting polarizer, as it is only the heating source that is controlled, and there is no need to precisely control the adsorption of the blue-absorbing dye. Additionally, the resulting polarizer provides improved environmental stability since the absorbing chromophores are intrinsic to the PVA matrix, and there is no dye adsorbed on the polarizer film surface.

To explore the blue performance of the K-type polarizer further, a number of samples were prepared using the following method. A cast film of polyvinyl alcohol, 75 μm thick, containing ~12% wt. glycerin plasticizer and with approximately 2400 average degree of polymerization, was stretched by a factor of 650% while being passed through a ~0.05 Normal aqueous solution of hydrochloric acid at a temperature of 52° C. After stretching, the film was passed through an IR heating zone where the film was heated, thus causing conversion of some of the PVA to polyvinylene blocks. While the film was continuously processed in this manner, the power applied to the IR heating zone was increased, and the temperature of the heater was monitored using a thermocouple. The geometry of the heater was different from that used in Examples 1-5, so the temperatures of the IR heater discussed in the previous examples do not necessarily correspond to those of this example.

As the heating temperature was increased, the resulting, un-borated polarizer was sampled. The un-borated polarizer was measured spectrally in the two orthogonal absorption axes (y and z) by orientation with a calcite crystal analyzer in a UV-visible spectrophotometer. The resulting $A_z$ and $A_y$ spectral curves were used to calculate the parallel and crossed state color of the raw polarizer samples and wavelength of maximum absorption ($\lambda_{max}$) of the $A_z$ component as a function of IR temperature.

Figure 9:
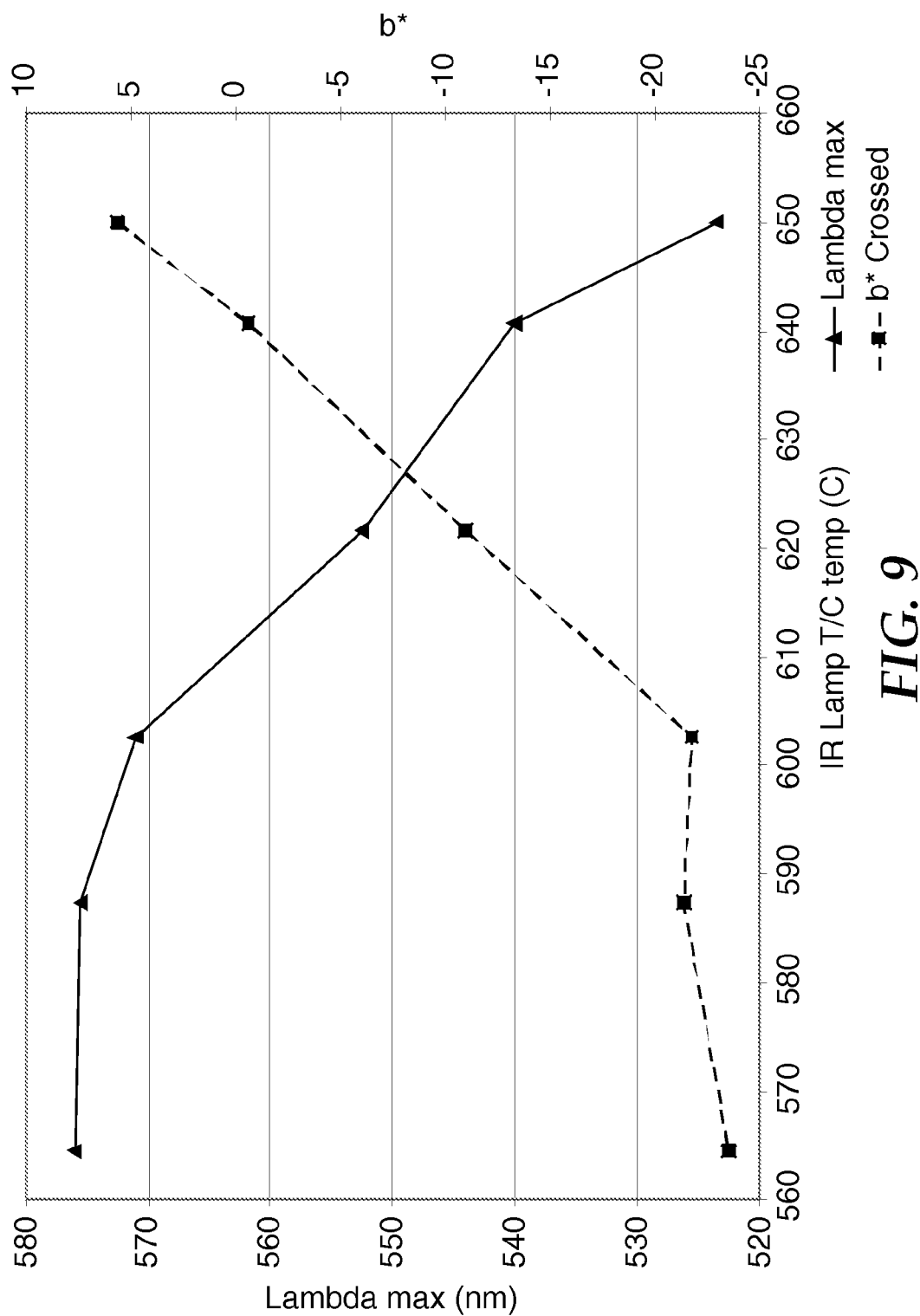
FIG. 9 presents a graph showing the value of peak absorption and the value of the b* color co-ordinate for polarizers as a function of conversion temperature

The results are shown in the graph in FIG. 9. The value of $\lambda_{max}$ (solid curve) reduces as the temperature increases, indicating that the concentration of smaller conjugated vinylene molecules (low n) increases with increasing temperature. Also shown in FIG. 9 is a curve (dashed line) that shows the value of b* for crossed polarizers as a function of IR temperature. The value of b* is close to zero for this particular manufacturing process at a temperature of about 645° C.

EXAMPLE 7

Comparison with Different Types of Polarizers

The performance of a polarizer manufactured according to the processes discussed here, and referred to as Wet KE, or wet-stretch KE polarizer, was compared to that of other types of polarizers. The wet-stretch KE polarizer was manufactured under conditions similar to those for Sample 10.

The other types of polarizers included an iodine polarizer, a dye stuff polarizer and a dry stretch KE polarizer (Dry KE). The iodine polarizer had a layer of PVA with adsorbed iodine molecules, sandwiched between two layers of cellulose triacetate (TAC), and was taken from a Sharp model 13B2UA LCD television, supplied by Sharp Electronics Corp, Mahwah, N.J. The dye stuff polarizer had a layer of PVA with adsorbed dichroic dyes, sandwiched between two layers of TAC, and was taken from a Philips active matrix display, model no. LTE072T, supplied by Philips Consumer Electronics North America, Atlanta, Ga.

The dry stretch polarizer was a K-type polarizer made using a process that included a 7× dry stretching step at 182° C. After dry stretching step, the film was exposed to hydrochloric acid vapors and dehydrated by heating the fumed film in an oven at a temperature in excess of 125° C., for example as discussed in U.S. Pat. No. 5,666,223.

The film was dipped into a first boration bath, held at a temperature of 80° C., that contained a solution of 7% boric acid and 3% borax. The film relaxed in length by 10% when in the first bath. The film was then dipped in a second boration bath, at a temperature of 88° C., that contained a solution of 9.5% boric acid and 3% borax. The film was stretched to a ratio of 1.15 in the second boration bath and then stretched by another ratio of 1.06 after removal from the second boration bath, for an overall stretch ratio of 7.7. The film was dried following the final stretch.

Figure 10:
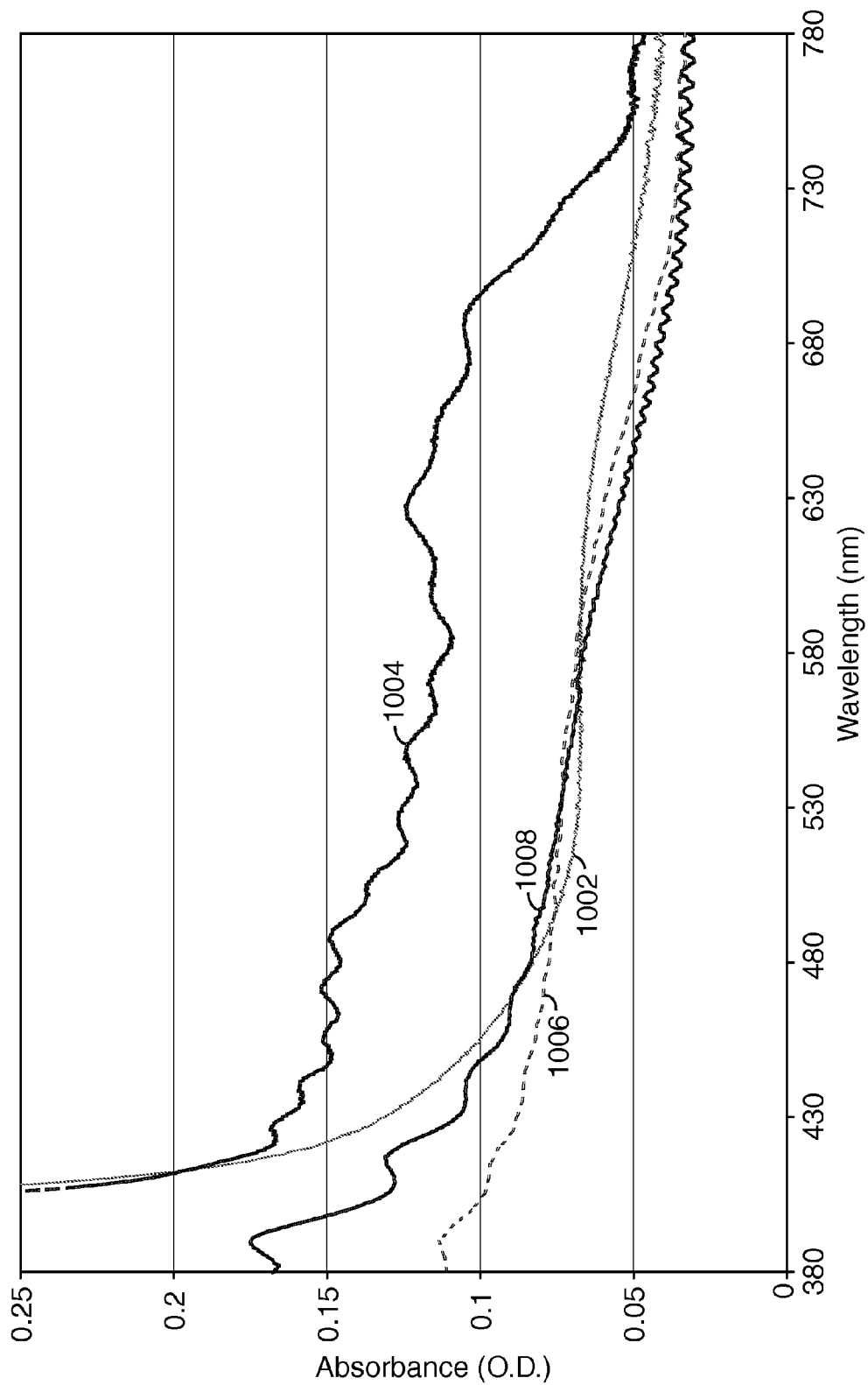
FIG. 10 presents a graph showing the absorbance in a single polarizer sheet for four different types of polarizer sheets.
Figure 11:
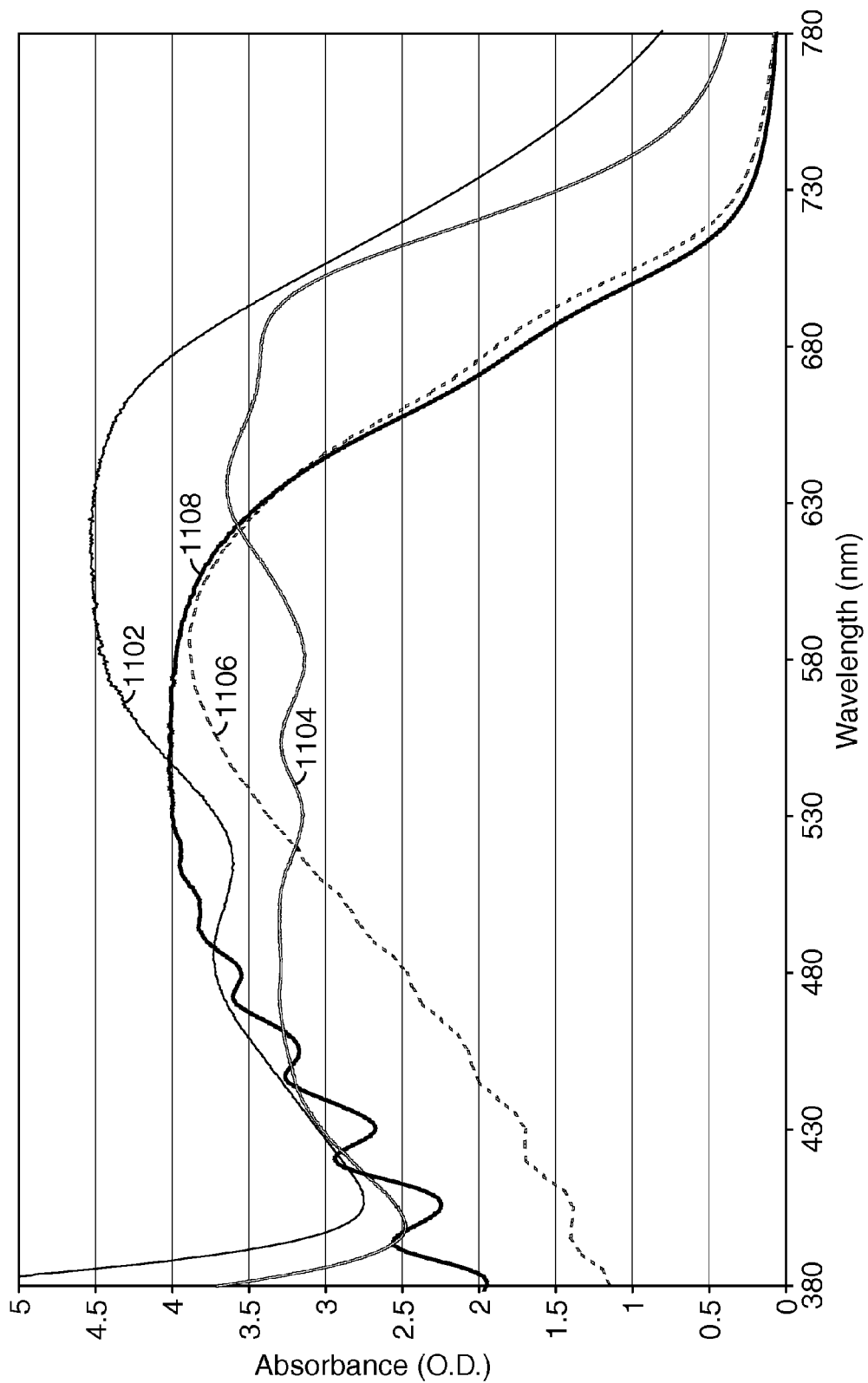
FIG. 11 presents a graph showing the absorbance in a pair of crossed polarizer sheets for four different types of polarizer sheets.

The absorbance of each polarizer, as a function of wavelength, was calculated from measurements made using the Cary Model 5E spectrophotometer. The absorbance (optical density) for each polarizer is shown in FIG. 10, as a function of wavelength, for light polarized parallel to the transmission axis of each polarizer. The absorbance curves for the iodine, dyestuff, dry stretch and wet stretch polarizers are respectively numbered as curves 1002, 1004, 1006 and 1008 in FIG. 10. The absorbance (optical density) spectrum for each polarizer is shown in FIG. 11 for light polarized perpendicular to the transmission axis of each polarizer. The absorbance curves for the iodine, dyestuff, dry stretch and wet stretch polarizers are respectively numbered as curves 1102, 1104, 1106 and 1108 in FIG. 11. Polarization and transmission characteristics for the four different types of polarizers are listed in Table XI, and the color characteristics are listed in Table XIII.

TABLE XI

Polarization and Transmission Characteristics

| Polarizer | Polarizing co-eff. (%) | D | Cont. Ratio | Single (Kv) (%) | Parallel (%) | Crossed (%) |
|---|---|---|---|---|---|---|
| Iodine | 99.98 | 120.0 | 4411 | 42.7 | 36.5 | 0.0083 |
| Dye | 99.85 | 37.4 | 686 | 37.8 | 28.6 | 0.0416 |
| Dry KE | 99.86 | 90.9 | 731 | 42.5 | 36.1 | 0.0494 |
| Wet KE | 99.96 | 110.9 | 2434 | 42.7 | 36.4 | 0.0149 |

TABLE XII

Color Characteristics

| Polarizer | single a* | single b* | par. a* | par. b* | crossed a* | crossed b* |
|---|---|---|---|---|---|---|
| Iodine | -2.054 | 4.356 | -3.699 | 8.119 | 0.165 | -0.480 |
| Dye | -0.948 | 3.484 | -1.618 | 6.289 | -0.063 | -0.079 |
| Dry KE | 0.442 | 0.881 | 0.278 | 2.784 | 6.840 | -12.767 |
| Wet KE | -0.457 | 3.245 | -0.806 | 6.160 | 0.778 | -0.816 |

The dye stuff polarizer absorbs significantly more light in the pass polarization state than for the other three types of polarizer, shown by the high absorbance in FIG. 10. This gives rise to the significantly lower values of Kv and parallel transmission for the dye stuff polarizer listed in Table XI. Both the iodine and dye stuff polarizer have layers of TAC, which absorbs light in the blue: this explains the substantially identical absorbance in FIG. 10 for the iodine and dye stuff polarizers for wavelengths less than about 430 nm. Both the wet-stretched and dry-stretched KE polarizers, on the other hand, absorb less light in the wavelength range below about 450 nm than the iodine and dye stuff polarizers. It is believed that this relatively low value of blue light absorption is due to the absence of TAC layers in the KE polarizer.

Considering now the absorption curves presented in FIG. 11, which show absorption of light polarized perpendicular to the transmission axis, the iodine polarizer shows the highest value of absorption (OD about 4.5) for wavelengths in the range 400 nm-700 nm. The wet-stretch KE polarizer, on the other hand, has a maximum OD of about 4, and demonstrates levels of absorption similar to that for the iodine polarizer for wavelengths between about 400 nm and 550 nm. The absorption of the wet-stretch KE polarizer is significantly higher in the range 400 nm-550 nm than for the dry-stretch KE polarizer. This confirms that the process used to manufacture the wet-stretch KE polarizer results in increased numbers of short chain (low n) polyvinylene blocks.

Review of the polarization and transmission characteristics listed in Table XI shows that the wet-stretch polarizer displays better performance than the dyestuff polarizer and the dry-stretch polarizer, and is comparable in most characteristics to the iodine polarizer. Also, in terms of the color characteristics, listed in Table XII, the wet stretch KE polarizer shows performance that is as color neutral as, if not more neutral than, that of the iodine polarizer. In particular, the hue of light transmitted through parallel polarizers is more neutral with the wet-stretch KE polarizer than the iodine polarizer, for both a* and b*. More particularly, the magnitude of a* is less than one for the wet-stretch KE polarizer, compared with a magnitude of more than 3 for the iodine polarizer. Also, the value of b* (6.1599) is less for the wet-stretch KE polarizer than for the iodine polarizer (8.1189).

For the crossed polarizer configuration, the magnitudes of a* and b* are both slightly less for the iodine polarizer than for the wet-stretch KE polarizer. However, the magnitudes of a* and b* for the wet-stretch polarizer are both less than one, which means that there is no perceptible hue, or only a barely perceptible hue, for the wet-stretch polarizer. The color characteristics of the dye stuff polarizer are similar to those of the wet-stretch polarizer for parallel and crossed configurations, but the transmission and polarization characteristics of the dye stuff polarizer are not as good as those of the wet-stretch KE polarizer.

The absorption of light polarized perpendicular to the transmission axis is higher in the red end of the spectrum for both the iodine and dye stuff polarizers than for either the wet-stretch KE polarizer or the dry-stretch polarizer, as is seen in FIG. 11. This is not a significant advantage, however, for applications where the light passing through the polarizer is to be viewed by the human eye and/or where the light source illuminating the polarizer has low output in the red portion of the spectrum.

Figure 12:
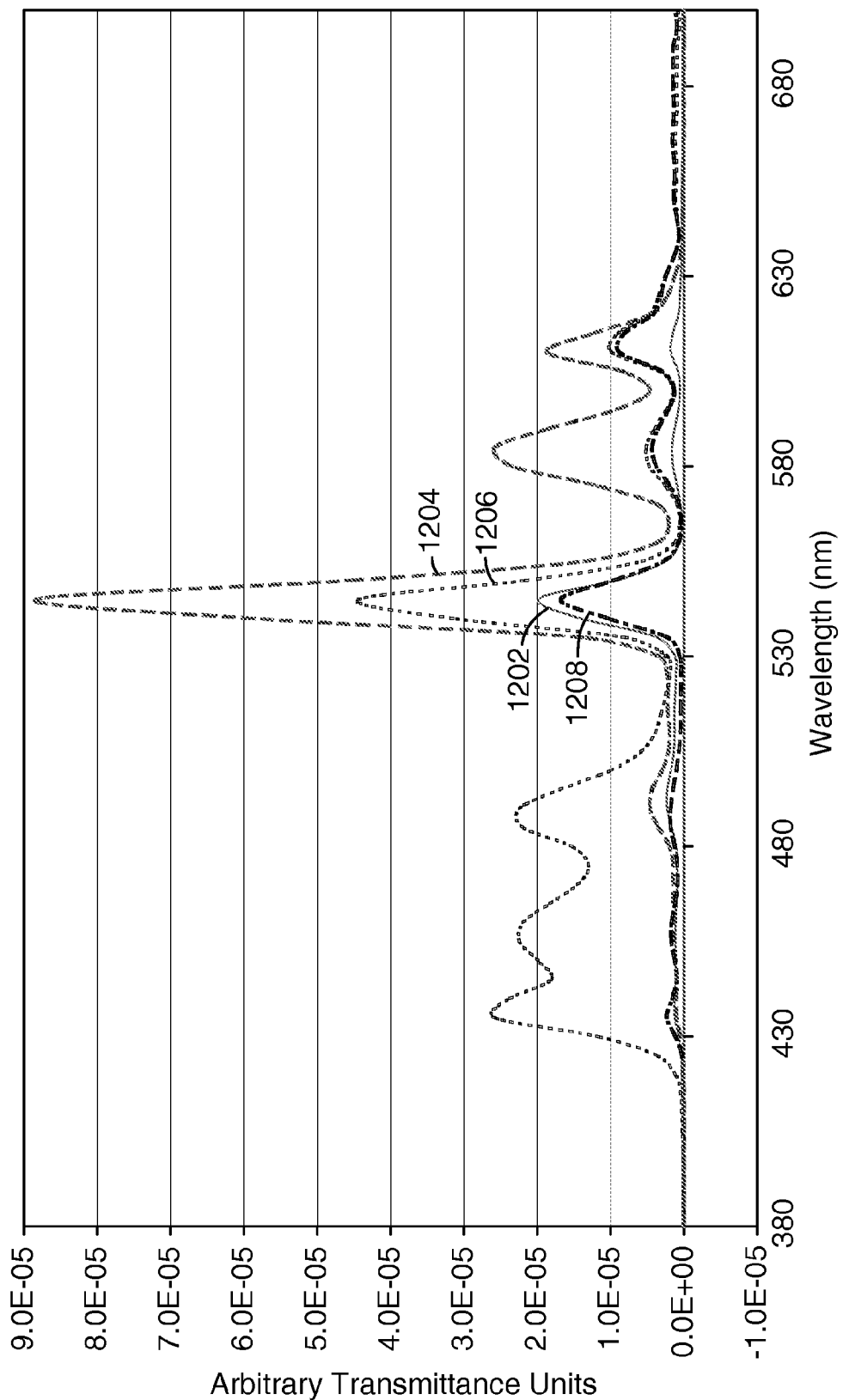
FIG. 12 presents a graph showing the crossed transmission through four different types of polarizers, for light emitted from a CCFT light source having an emission spectrum as shown in FIG. 3, and photopically corrected for the response of the human eye.

When the wavelength dependent response of the human eye and commonly used light sources are considered, the performance of the wet-stretch KE polarizer is similar to that of the iodine polarizer. FIG. 12 shows the photopically corrected transmission for crossed polarizers for the four different types of polarizers, where the illumination source is assumed to be the standard CCFT source. The photopically corrected transmission curves for the iodine, dyestuff, wet stretch and dry stretch polarizers are respectively labeled 1202, 1204, 1206 and 1208. The area under each curve corresponds to the photopically corrected transmission through the crossed polarizer pair. Both the dye stuff and dry-stretch polarizers allow significant leakage of light at the 550 nm peak, and the dry-stretch polarizer also transmits significant amounts of light in the blue region of the spectrum. The transmission through crossed wet-stretch polarizers is almost exactly the same as through crossed iodine polarizers, except for small differences at about 580 nm and 610 nm. These differences, however, are small, as is evidenced by the fact that magnitudes of a* and b* are both less than one for the crossed, wet-stretch polarizer.

Thus, a KE polarizer manufactured in accordance with the description herein shows transmission, polarization and color properties that are substantially the same as iodine polarizers. KE polarizers are intrinsic and, unlike iodine or dye stuff polarizers, do not require the adsorption of dichroically absorbing species, and do not require cover layers, such as TAC, for environmental stability. Thus, a practical KE polarizer may be made thinner than either iodine or dye stuff polarizers, has a less complex structure than iodine or dye stuff polarizer, and is less expensive to manufacture than iodine or dye stuff polarizers. Furthermore, the wet-stretch polarizers are more able to withstand conditions of high humidity than iodine or dye stuff polarizers.

Intrinsic polarizers as described herein may be used with other layers. For example, a polarizer may be used with a substrate to provide structural support, or may be used with a liquid crystal display. The other layers used with the polarizer may be isotropic or may be birefringent.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:
1. An intrinsic polarizer, comprising:
a sheet of polyvinyl alcohol-type matrix including vinylene polymer blocks, the sheet defining a pass polarization axis and a block polarization axis perpendicular to the pass polarization axis, light having an electrical vector parallel to the pass polarization axis being substantially transmitted through the sheet and light having an electrical vector parallel to the block polarization axis being substantially absorbed by the vinylene polymer blocks, the sheet having an intrinsic absorption spectrum such that, when crossed with an identical sheet and illuminated with a cold cathode fluorescent tube (CCFT) light source, the sheet transmits light having an a* co-ordinate with a magnitude of less than 2 and a b* co-ordinate with a magnitude of less than 2, wherein the a* and b* co-ordinates are measured accordingly to the CIELAB color system,
a concentration of vinylene polymer blocks having a chain length n less than or equal to 9 being greater than a concentration of vinylene polymer blocks having a chain length greater than 9.

2. The polarizer according to claim 1, wherein the transmitted light has an a* value with a magnitude less than 1.

3. The polarizer according to claim 1, wherein the transmitted light has a b* value with a magnitude less than 1.

4. The polarizer according to claim 1, wherein the transmitted light has an a* value with a magnitude of less than 1 and a b* value with a magnitude less than 1.

5. The polarizer according to claim 1, wherein the sheet exhibits a ratio, R, having a value of less than 2, where R is a ratio of absorbance for light at 550 nm polarized parallel to the block polarization axis over absorbance for light at 400 nm polarized parallel to the block polarization axis.

6. The polarizer according to claim 5, wherein R has a value of less than 1.7.

7. The polarizer according to claim 1, wherein the sheet exhibits a polarization efficiency in excess of 99%.

8. The polarizer according to claim 7, wherein the polarization efficiency ratio is greater than 99.5%.

9. The polarizer according to claim 7, wherein the polarization efficiency ratio is greater than 99.8%.

10. The polarizer according to claim 1, wherein the average light transmission for unpolarized light, Kv, through the sheet is greater than 42%.

11. The polarizer according to claim 10, wherein Kv has a value greater than 43%.

12. The polarizer according to claim 1, wherein the sheet exhibits a polarization dichroic ratio of more than 100.

13. The polarizer according to 12, wherein the sheet exhibits a dichroic ratio of more than 110.

* * * * *